United States Patent
Azizan et al.

(10) Patent No.: US 10,620,609 B2
(45) Date of Patent: Apr. 14, 2020

(54) CONTROL DEVICE, CONTROL SYSTEM, AND RECORDING MEDIUM

(71) Applicant: OMRON Corporation, Kyoto (JP)

(72) Inventors: SitiAisyah Azizan, Kusatsu (JP); Masaki Namie, Takatsuki (JP); Mikiko Manabe, Takatsuki (JP)

(73) Assignee: OMRON Corporation, Kyoto (JP)

( * ) Notice: Subject to any disclaimer, the term of this patent is extended or adjusted under 35 U.S.C. 154(b) by 80 days.

(21) Appl. No.: 15/787,704

(22) Filed: Oct. 18, 2017

(65) Prior Publication Data

US 2018/0210416 A1   Jul. 26, 2018

(30) Foreign Application Priority Data

Jan. 25, 2017 (JP) ................................ 2017-011079

(51) Int. Cl.
*G05B 19/31* (2006.01)
*G05B 19/402* (2006.01)
*G05B 19/404* (2006.01)

(52) U.S. Cl.
CPC .......... *G05B 19/311* (2013.01); *G05B 19/402* (2013.01); *G05B 19/404* (2013.01);
(Continued)

(58) Field of Classification Search
CPC .. G05B 19/311; G05B 19/404; G05B 19/402; G05B 2219/41161; G05B 2219/41154; G05B 2219/37506
(Continued)

(56) References Cited

U.S. PATENT DOCUMENTS 4,835,718 A * 5/1989 Breyer ................... G01B 7/008
33/503
2003/0045982 A1 * 3/2003 Kondo ................ B62D 15/025
701/41
(Continued)

FOREIGN PATENT DOCUMENTS

JP   2003-323216   11/2003
JP   2012-108892   6/2012
(Continued)

OTHER PUBLICATIONS

"Search Report of Europe Counterpart Application", dated May 3, 2018, p. 1-p. 9.

*Primary Examiner* — Ziaul Karim
(74) *Attorney, Agent, or Firm* — JCIPRNET

(57) ABSTRACT

A control device, a control program and a control system are provided. The control device includes: a first identification device for giving a first command as a command value to a drive device and determining a torque required for the controlled object to execute the first command; a second identification device for giving a second command as the command value and a third command as a compensation command to the drive device and determining a preceding switching time based on a response from the controlled object; a command value updating device for sequentially updating the command value based on a predetermined target trajectory; and a compensation command updating device for sequentially updating the compensation command based on the command value. The compensation command updating device updates the compensation command according to a moving direction after a reversal of the moving direction of the controlled object in the target trajectory.

8 Claims, 15 Drawing Sheets

(52) U.S. Cl.
CPC ............ *G05B 2219/37506* (2013.01); *G05B 2219/41154* (2013.01); *G05B 2219/41161* (2013.01)

(58) Field of Classification Search
USPC ........................................................ 700/302
See application file for complete search history.

(56) References Cited

U.S. PATENT DOCUMENTS

| | | | | |
|---|---|---|---|---|
| 2005/0166413 | A1* | 8/2005 | Crampton | ............... B25J 13/088 |
| | | | | 33/503 |
| 2009/0204272 | A1* | 8/2009 | Yuzawa | ................. G05B 19/27 |
| | | | | 700/302 |
| 2012/0092402 | A1 | 4/2012 | Iwai | |
| 2016/0008983 | A1* | 1/2016 | Osaka | .................... B25J 9/1692 |
| | | | | 700/254 |
| 2016/0263747 | A1* | 9/2016 | Yokoi | .................... B25J 9/1633 |

FOREIGN PATENT DOCUMENTS

| | | |
|---|---|---|
| JP | 2016-039737 | 3/2016 |
| WO | 2004074951 | 9/2004 |

\* cited by examiner (A)Position [mm]

(B)Speed [mm/s]

(C)Torque [%]

CONTROL DEVICE, CONTROL SYSTEM, AND RECORDING MEDIUM

CROSS-REFERENCE TO RELATED APPLICATION

This application claims the priority benefit of Japanese application serial no. 2017-011079, filed on Jan. 25, 2017. The entirety of the above-mentioned patent application is hereby incorporated by reference herein and made a part of this specification.

BACKGROUND OF THE INVENTION

Field of the Invention

The present invention relates to a technique of reducing an error due to kinetic friction in a position control system.

Description of Related Art

In the related art, a technique of controlling a position of a device using a motor or the like is known. There are various applications using position control. In such position control, since a structure is driven, kinetic friction is generated with movement of an object. Such kinetic friction is an error from the viewpoint of a position control system. Since the magnitude of generated kinetic friction varies depending on a mutual relationship between objects, it is difficult to perform setting for compensating for the error.

The following prior art is known as techniques for compensating for an error due to kinetic friction.

Japanese Unexamined Patent Application Publication No. 2003-323216 (Patent Document 1) discloses a starting friction compensating function for solving a problem that, in the starting friction compensating function of a conventional position control device, a timing at which an operation delay of a shaft due to static friction is actually generated and a timing at which a friction compensating operation is performed do not match because the friction compensating operation is performed in a starting direction when a moving direction is changed before and after a shaft stops and the friction compensating operation is not performed when the moving direction is not changed before and after the shaft stops.

Japanese Unexamined Patent Application Publication No. 2012-108892 (Patent Document 2) discloses a numerical control device that can correct quadrant projection by estimating a friction force or a friction torque with high accuracy from a low-speed range to a high-speed range in a double nut pre-load type feed drive mechanism.

Japanese Unexamined Patent Application Publication No. 2016-039737 (Patent Document 3) discloses a configuration for compensating for most of a friction torque by identifying a kinetic friction torque of a wave reduction gear and feed-forwarding a torque for compensating for the kinetic friction torque.

PRIOR ART DOCUMENTS

Patent Documents

[Patent Document 1] Japanese Unexamined Patent Application Publication No. 2003-323216
[Patent Document 2] Japanese Unexamined Patent Application Publication No. 2012-108892
[Patent Document 3] Japanese Unexamined Patent Application Publication No. 2016-039737

SUMMARY OF THE INVENTION

In a general position control system, various structures or drive devices are used as a controlled object. Patent Document 1 is for solving a problem specific to the conventional position control device and cannot be generally applied. The numerical control device disclosed in Patent Document 2 is used for a double nut pre-load type feed drive mechanism and cannot be applied to different controlled objects or the like as it is. Patent Document 3 focuses on a wave reduction gear and cannot be applied to different controlled objects or the like as it is.

Therefore, there is demand for a technique of appropriately reducing an error due to kinetic friction depending on kinetic characteristics of a controlled object in position control.

According to an aspect of the invention, there is provided a control device that performs position control of a controlled object by giving a command value and a compensation command to a drive device that drives the controlled object. The drive device is configured to calculate an amount of operation of the controlled object on the basis of the command value from the control device and a feedback value from the controlled object, to correct the calculated amount of operation on the basis of the compensation command from the control device, and to give the corrected amount of operation to the controlled object. The control device includes: a first identification device configured to give a first command as the command value to the drive device and to determine a torque required for the controlled object to execute the first command; a second identification device configured to give a second command as the command value and a third command as the compensation command to the drive device and to determine a preceding switching time on the basis of a response from the controlled object; command value updating device configured to sequentially update the command value given to the drive device on the basis of a predetermined target trajectory; and a compensation command updating device configured to sequentially update the compensation command given to the drive device on the basis of the command value given to the drive device. The compensation command updating device updates a value of the compensation command to a value corresponding to a moving direction after a reversal of the moving direction of the controlled object in the target trajectory when the reversal occurs at a time point earlier by the preceding switching time.

Preferably, the first identification device is configured: to give a command for moving the controlled object in a first direction at a predetermined speed and a command for moving the controlled object in a second direction different from the first direction at a predetermined speed as the first command to the drive device; and to determine a first compensation value in the first direction on the basis of a torque required for movement in the first direction and to determine a second compensation value in the second direction on the basis of a torque required for movement in the second direction.

Preferably, the second identification device is configured: to give a command for changing the controlled object from a state of moving in the second direction to a state in of stopping as the second command to the drive device and to give a command for reversing the moving direction of the controlled object to the first direction as the third command to the drive device; and to determine the preceding switching time on the basis of a time required from when the compensation command is given to the drive device until a direction of change over time of the feedback value from the controlled object.

Preferably, the second identification device determines the third command on the basis of the first compensation value and the second compensation value.

Preferably, the second identification device defines the preceding switching time to be an integer multiple of an update period for the command value which is given from the control device.

Preferably, the first identification device determines the first compensation value or the second compensation value in a state in which a torque from the controlled object in response to the first command has settled.

Preferably, the first identification device determines the first compensation value or the second compensation value by averaging a plurality of measurement results for the torque.

Preferably, the drive device is configured to apply a filter to a control value which is corrected on the basis of the compensation command from the control device and to give the filtered control value to the controlled object, and the compensation command updating device is configured to update the compensation command which is given to the drive device by applying an inverse characteristic of a characteristic of the filter.

According to another aspect of the invention, there is provided a control program which is executed by a control device that performs position control of a controlled object by giving a command value and a compensation command to a drive device that drives the controlled object. The drive device is configured to calculate an amount of operation of the controlled object on the basis of the command value from the control device and a feedback value from the controlled object, to correct the calculated amount of operation on the basis of the compensation command from the control device, and to give the corrected amount of operation to the controlled object.

The control program causes the control device to perform: a step of giving a first command as the command value to the drive device and determining a torque required for the controlled object to execute the first command; a step of giving a second command as the command value and a third command as the compensation command to the drive device and determining a preceding switching time on the basis of a response from the controlled object; a step of sequentially updating the command value which is given to the drive device on the basis of a predetermined target trajectory; and a step of sequentially updating the compensation command given to the drive device on the basis of the command value given to the drive device. The step of sequentially updating the compensation command comprises a step of updating a value of the compensation command to a value corresponding to a moving direction after a reversal of the moving direction of the controlled object in the target trajectory when the reversal occurs at a time point earlier by the preceding switching time.

According to another aspect of the invention, there is provided a control system including: a drive device that drives a controlled object; and a control device that performs position control of the controlled object by giving a command value and a compensation command to the drive device. The drive device is configured to calculate an amount of operation of the controlled object on the basis of the command value from the control device and a feedback value from the controlled object, to correct the calculated amount of operation on the basis of the compensation command from the control device, and to give the corrected amount of operation to the controlled object. The control device includes a first identification device configured to give a first command as the command value to the drive device and to determine a torque required for the controlled object to execute the first command, a second identification device configured to give a second command as the command value and a third command as the compensation command to the drive device and to determine a preceding switching time on the basis of a response from the controlled object, a command value updating device configured to sequentially update the command value given to the drive device on the basis of a predetermined target trajectory, and a compensation command updating device configured to sequentially update the compensation command given to the drive device on the basis of the command value given to the drive device. The compensation command updating device updates a value of the compensation command to a value corresponding to a moving direction after a reversal of the moving direction of the controlled object in the target trajectory when the reversal occurs at a time point earlier by the preceding switching time.

According to an embodiment of the invention, it is possible to realize position control with an appropriately reduced error due to kinetic friction depending on kinetic characteristics of a controlled object.

DESCRIPTION OF THE EMBODIMENTS

Figure 1:
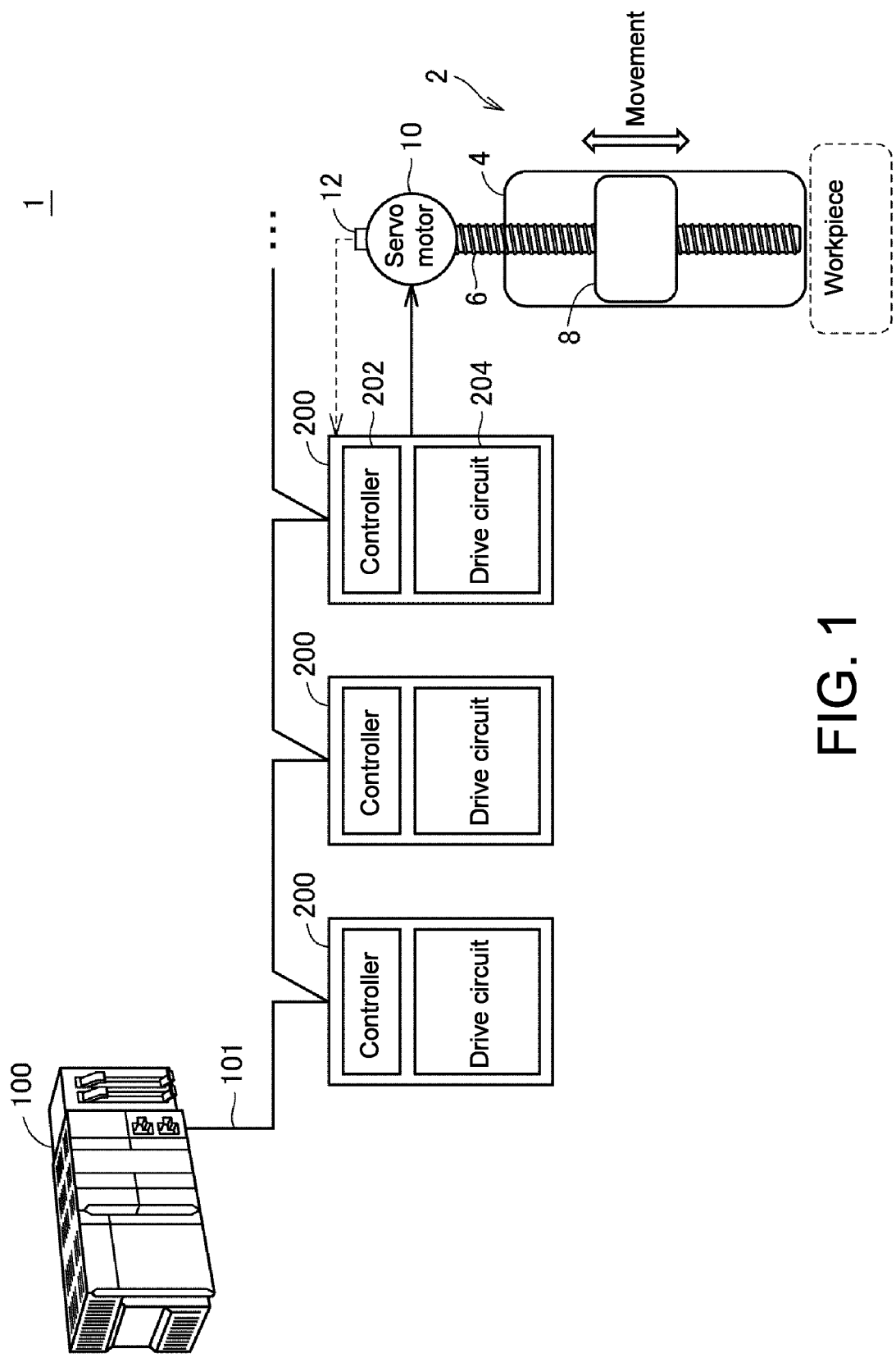
FIG. 1 is a schematic diagram illustrating an example of a configuration of a control system according to an embodiment of the invention.

An embodiment of the invention will be described below in detail with reference to the accompanying drawings. The same or corresponding elements in the drawings will be referenced by the same reference signs and description thereof will not be repeated.

A. CONFIGURATION OF CONTROL SYSTEM

First, an example of a configuration of a control system 1 according to an embodiment of the invention will be described. FIG. 1 is a schematic diagram illustrating an example of the configuration of the control system 1 according to this embodiment.

Referring to FIG. 1, the control system 1 includes a control device 100 and one or more drive devices. In the example illustrated in FIG. 1, a servo driver 200 that drives a servomotor is used as an example of the drive device. The drive device is not limited to a servo driver, and a corresponding drive device may be employed depending on a motor serving as a device to be driven. For example, when an induction motor or a synchronous motor is driven, an inverter driver or the like may be employed as the drive device.

FIG. 1 illustrates a configuration in which the control device 100 and one or more servo drivers 200 are connected via a field bus 101 as a representative example. The invention is not limited to this configuration and arbitrary communication device can be employed. Alternatively, the control device 100 and the servo drivers 200 may be directly connected via a signal line. A configuration in which the control device 100 and the servo driver 200 are integrated may be employed. So long as an algorithm for reducing an error due to kinetic friction is realized as described below, any implementation form may be employed.

The servo driver 200 drives a servomotor 10 which is also a part of a controlled object. In the example illustrated in FIG. 1, an actuator 2 using a ball screw is illustrated as a controlled object. The actuator 2 includes a ball screw 6 disposed at the center of a housing 4 to penetrate an upper portion thereof. A nut 8 serving as a movable member is engaged with the ball screw 6. The nut 8 is disposed in the housing 4 in a state in which rotation thereof is suppressed. The servomotor 10 is coupled to an end of the ball screw 6, the ball screw 6 and the nut 8 rotate relative to each other with rotation of the servomotor 10, and thus the nut 8 moves in an axial direction of the ball screw 6. The position of the nut 8 serving as a movable member can be controlled by this mechanism.

For example, a workpiece may be disposed in a moving direction of the nut 8 serving as the movable member. That is, when the position of the ball screw 6 changes with rotation of the ball screw 6, a relative distance between the movable member and the workpiece changes. When the nut 8 or another member (not illustrated) mechanically connected to the nut 8 comes in contact with the workpiece, a load is applied to the workpiece. The actuator 2 illustrated in FIG. 1 may be used, for example, to place a component on a certain substrate.

An encoder 12 is disposed on a rotation shaft of the servomotor 10, and the encoder 12 outputs a position, a rotation speed, a cumulative rotation speed, or the like of the servomotor 10 as a feedback value of the servomotor 10 to the servo driver 200. The feedback value from the servomotor 10 may be directly input to the control device 100.

B. HARDWARE CONFIGURATION OF CONTROL SYSTEM

An example of a hardware configuration of the control device 100 and the servo driver 200 in the control system 1 will be described below.

b1: Control Device 100

An example of the hardware configuration of the control device 100 according to this embodiment will be first described. The control device 100 according to this embodiment may be implemented, for example, using a programmable logic controller (PLC). The control device 100 performs a process of reducing an error due to kinetic friction which will be described later by causing a processor to execute a previously stored control program (which includes a system program and a user program which will be described later).

Figure 2:
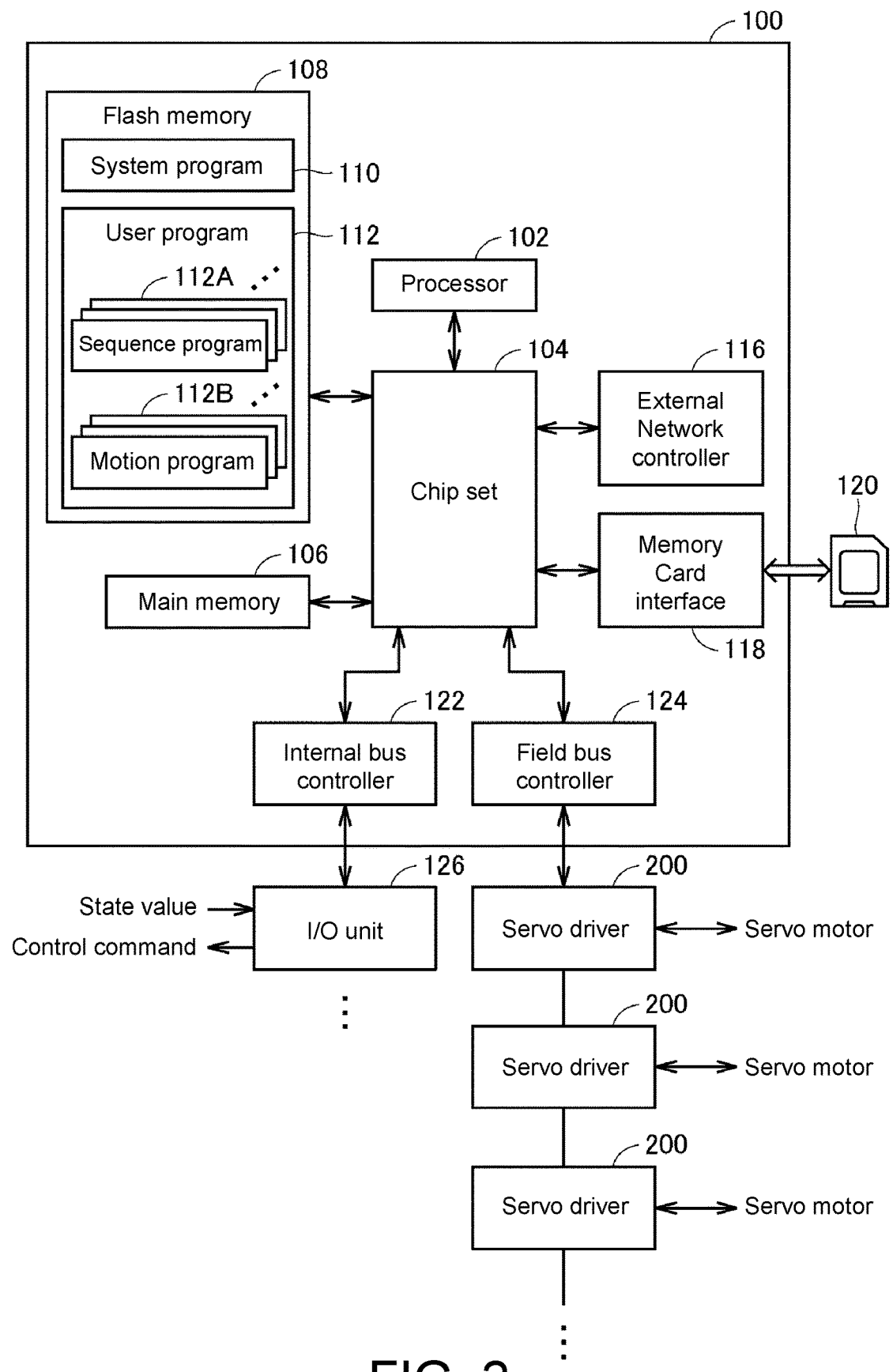
FIG. 2 is a schematic diagram illustrating an example of a hardware configuration of a control device according to the embodiment.

FIG. 2 is a schematic diagram illustrating an example of the hardware configuration of the control device 100 according to this embodiment. Referring to FIG. 2, the control device 100 includes a processor 102 such as a central processing unit (CPU) or a micro-processing unit (MPU), a chip set 104, a main memory 106, a flash memory 108, an external network controller 116, a memory card interface 118, an internal bus controller 122, and a field bus controller 124.

The processor 102 realizes arbitrary control for a controlled object by reading a system program 110 and a user program 112 stored in the flash memory 108, loading the programs into the main memory 106, and executing the programs. The system program 110 includes command codes for providing basic functions of the control device 100 such as processing of inputting and outputting data and execution time control. The user program 112 is arbitrarily designed depending on the controlled object and includes a sequence program 112A for performing sequence control and a motion program 112B for performing motion control.

The chip set 104 performs overall processes of the control device 100 by controlling components.

The internal bus controller 122 is an interface that transmits and receives data to and from various devices which are connected to the control device 100 via an internal bus. An I/O unit 126 is connected as an example of such devices.

The field bus controller 124 is an interface that transmits and receives data to and from various devices which are connected to the control device 100 via a field bus. The servo driver 200 is connected as an example of such devices.

The internal bus controller 122 and the field bus controller 124 can give an arbitrary command value to a device connected thereto and can acquire arbitrary data (which includes measurement values) which is managed by the devices.

The external network controller 116 controls transmission and reception of data via various wired/wireless networks. The memory card interface 118 is configured such that a memory card 120 is attachable and detachable, and can write data to the memory card 120 or read data from the memory card 120.

Some or all of functions which are provided by causing the control device 100 to execute a control program may be implemented as a dedicated hard wired circuit. Examples of the hard wired circuit include an application specific integrated circuit (ASIC) or a field-programmable gate array (FPGA).

b2: Servo Driver 200

Referring to FIG. 1 again, the servo driver 200 includes a controller 202 that performs operations associated with a control loop which will be described later and a drive circuit 204 that drives the servomotor 10 on the basis of operation results from the controller 202. The controller 202 may be implemented, for example, using an application specific integrated circuit (ASIC) or a field-programmable gate array (FPGA). Alternatively, the controller 202 may be implemented by causing the processor to execute a program. The drive circuit 204 typically includes a converter that converts AC power to DC power and an inverter circuit that converts DC power generated by the converter into AC power with a designated phase and frequency.

C. FUNCTIONAL CONFIGURATION OF SERVO DRIVER

Figure 3:
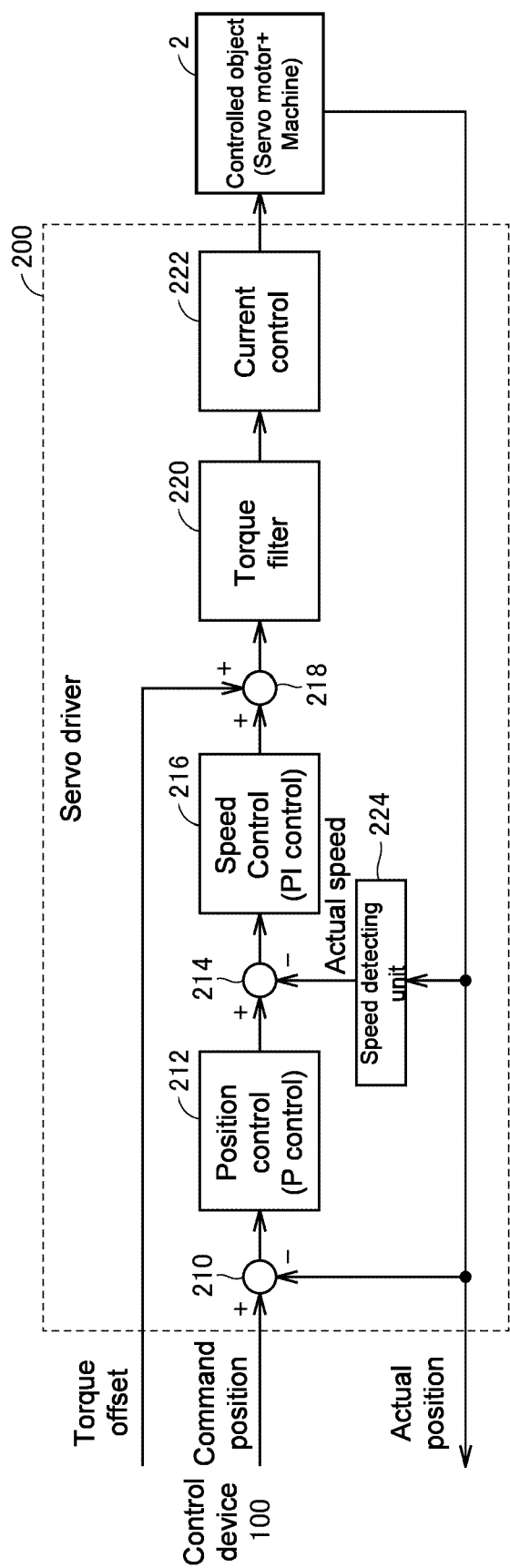
FIG. 3 is a schematic diagram illustrating an example of a functional configuration of a servo driver which is connected to the control device according to the embodiment.

An example of the functional configuration of the servo driver 200 which is connected to the control device 100 according to this embodiment will be described below. FIG. 3 is a schematic diagram illustrating an example of the configuration of the servo driver 200 which is connected to the control device 100 according to this embodiment. Functional blocks illustrated in FIG. 3 are embodied by the controller 202 of the servo driver 200 (see FIG. 1).

In the control system 1 according to this embodiment, a command position as a command value is given from the control device 100 to the servo driver 200. The servo driver 200 controls a driving current supplied to the servomotor 10 such that an actual position of the actuator 2 serving as a controlled object matches the command position from the control device 100.

The control device 100 gives a compensation command for reducing an error due to kinetic friction to the servo driver 200 in addition to the command position. In the following description, a configuration in which a torque offset indicating a compensation value for a command torque used as an example of the compensation command will be described. A compensation command for compensating for a speed, an acceleration, or the like instead of compensating for the command torque may be used.

The control device 100 acquires a feedback value (an actual position) from the servomotor 10 as information for calculating a torque offset. A configuration via the servo driver 200 is exemplified as a method of feeding back the actual position of the servomotor 10 to the control device 100 in FIG. 3, but the feedback value may be output from the encoder 12 of the servomotor 10 to the control device 100.

Details of the method of calculating a torque offset given to the servo driver 200 will be described later.

In this way, the control device 100 performs position control of a controlled object by giving a command value (a command position) and a compensation command (a torque offset) to the drive device (the servo driver 200) that drives the controlled object.

The servo driver 200 calculates an amount of operation of a controlled object on the basis of a command value (a command position) from the control device 100 and a feedback value (the actual position or an actual speed) from the controlled object, corrects the calculated amount of operation on the basis of a compensation command (a torque offset) from the control device 100, and then gives the corrected amount of operation to the controlled object.

More specifically, in the servo driver 200, a control loop including a minor loop for the speed in addition to a main loop for the position is implemented. Specifically, the servo driver 200 includes difference calculating units 210 and 214, a position control unit 212, a speed control unit 216, an adder unit 218, a torque filter 220, a current control unit 222, and a speed detecting unit 224 as a functional configuration.

The position control unit 212 is a control calculation unit that constitutes a control loop for position, and outputs a control value based on a deviation between the command value and the actual position (a feedback value) calculated by the difference calculating unit 210. The position control unit 212 may typically use proportional (P) control. That is, the position control unit 212 outputs a value obtained by multiplying the deviation between the command value and the actual position by a predetermined proportional coefficient as a control value.

The speed control unit 216 is a control calculation unit that constitutes a control loop for speed and outputs a control value based on a deviation between the control value from the position control unit 212 and an actual speed from the speed detecting unit 224 calculated by the difference calculating unit 214. The speed control unit 216 may typically use proportional integration (PI) control. That is, the speed control unit 216 outputs a sum of a value obtained by multiplying the deviation between the command speed from the position control unit 212 and the actual speed by a proportional coefficient and a value integrated by an integrating element as a control value.

The adder unit 218 adds a torque offset given from the control device 100 to the torque command (or an amount of operation) from the speed control unit 216. That is, the torque command (or the amount of operation) from the speed control unit 216 is corrected using the torque offset from the control device 100. The adder unit 218 outputs a control value obtained by adding the torque offset (that is, a kinetic friction compensation torque) to the control value from the speed control unit 216. The amount of operation output from the adder unit 218 corresponds to a command torque which should be generated by the servomotor 10.

The torque filter 220 relaxes a degree of change over time such that a degree of change per unit time (a rate of change) of the control value (the command value of the torque which should be generated in the servomotor 10) output from the adder unit 218 is not excessively great. That is, the torque filter 220 can blunt the control value output from the adder unit 218. The control value from the torque filter 220 is given to the current control unit 222.

The current control unit 222 determines a switching time in the drive circuit 204 (see FIG. 1) in accordance with the control value from the torque filter 220. That is, the current control unit 222 determines a magnitude, a timing, a wave-form, and the like of a current supplied to the servomotor 10 to realize the command torque determined by the torque filter 220. The drive circuit 204 is driven on the basis of the control value determined by the current control unit 222. The servomotor 10 of the actuator 2 is rotationally driven by the current supplied from the drive circuit 204 so as to cause displacement of the actuator 2.

An actual position is output from the encoder 12 (see FIG. 1) as a feedback value indicating the displacement of the actuator 2, and the speed detecting unit 224 differentiates the actual position from the encoder 12 to calculate an actual speed.

The servo driver 200 can realize position control of a controlled object including the servomotor 10 by combining the above-mentioned functions.

D. OUTLINE

An outline of processing in the control system 1 according to this embodiment will be described below.

In general, in a position control system, kinetic friction is generated depending on a direction of a speed of all or some members of a controlled object. Accordingly, by simply giving a command value (a command position or a command speed) from the control device to the servo driver or the like, the controlled object may not perform behavior according to the command value due to an influence of the generated kinetic friction.

Accordingly, in order to reduce an error due to such kinetic friction, kinetic friction compensation is performed to generate a larger torque. A kinetic friction compensating method in a general position control system will be first described below.

Figure 4:
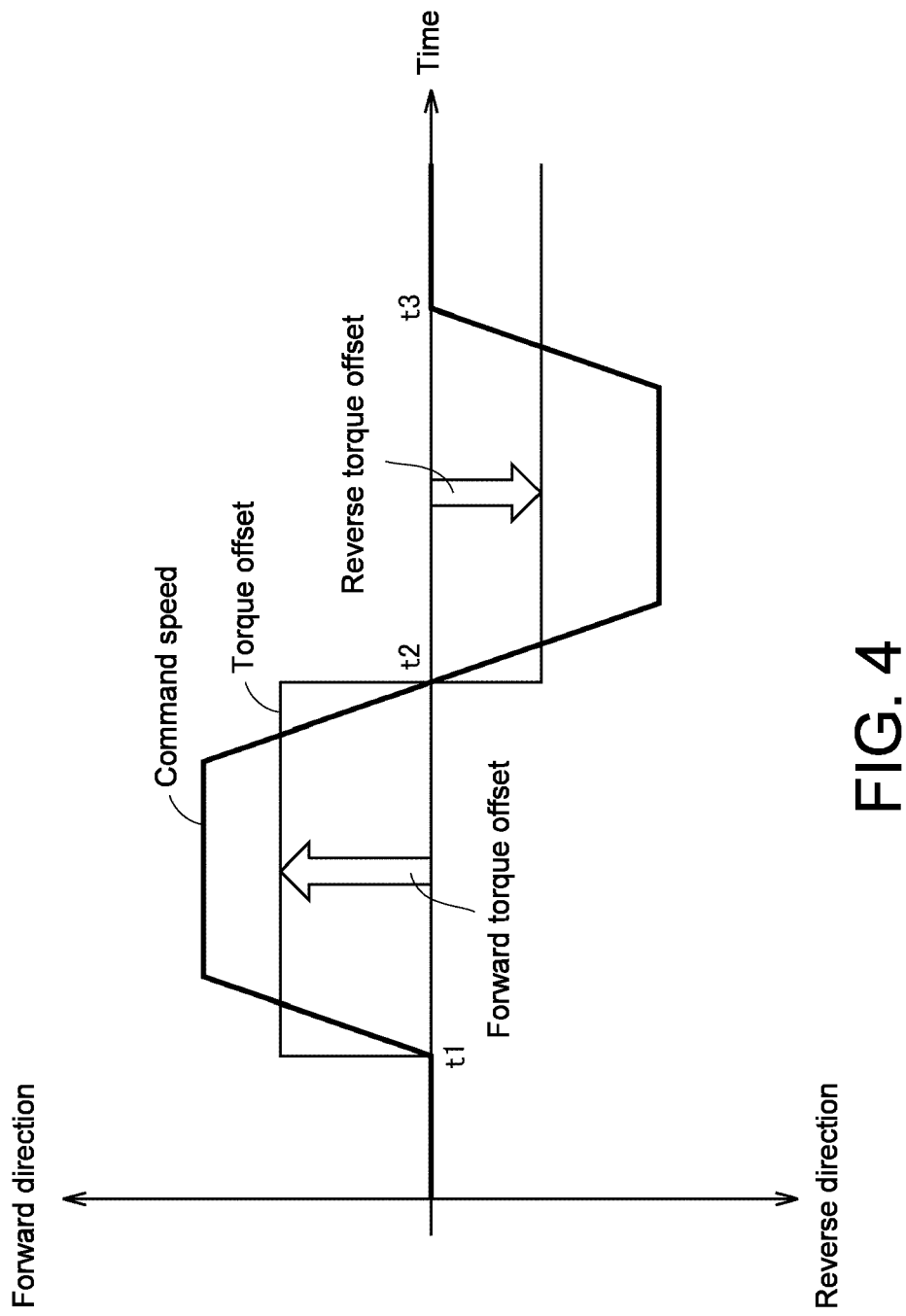
FIG. 4 is a schematic diagram illustrating an example of a kinetic friction compensating method in a position control system.

FIG. 4 is a schematic diagram illustrating an example of a kinetic friction compensating method in a position control system. FIG. 4 illustrates behavior of the position control system when a controlled object moves in a predetermined moving direction like the actuator 2 illustrated in FIG. 1. In the following description, one moving direction of the controlled object is defined as a "forward direction" and the other moving direction is defined as a "reverse direction."

A command speed illustrated in FIG. 4 is for temporarily moving a controlled object in the forward direction from an initial position, switching the moving direction to the reverse direction, and returning the controlled object to the same initial position. For the purpose of explanation, only change over time of a command speed is illustrated in FIG. 4, but a command position corresponding to an integration over time of the command speed may be actually given to the servo driver.

Since kinetic friction forces generated when a controlled object is moved in the forward direction and the reverse direction may be different from each other, a torque offset (a compensation value of a kinetic friction torque) for correcting the kinetic friction force generated at the time of movement in each direction is determined for each direction.

In FIG. 4, it is assumed that a forward torque offset which is a compensation value of a kinetic friction torque when the controlled object moves in the forward direction and a reverse torque offset which is a compensation value for a kinetic friction torque when the controlled object moves in the reverse direction are set in advance.

When forward and reverse command speeds are given to the controlled object using the torque offset set in advance, forward and reverse torque offsets are set. In the example illustrated in FIG. 4, the command speed starts increasing from zero at time t1. At time t1, the forward torque offset is set as the torque offset. Thereafter, at time t2, the command speed is switched from the forward direction to the reverse direction. At time t2, the reverse torque offset is set as the torque offset. At time t3, the command speed is returned to zero, but the torque offset is maintained.

As a result of such setting and switching of the torque offset, excessive torque corresponding to the generated kinetic friction is generated, and the controlled object moves in accordance with the command value.

The kinetic friction compensating method in the position control system illustrated in FIG. 4 functions well from a macroscopic viewpoint, but a certain position deviation may be generated from a microscopic viewpoint.

Figure 5:
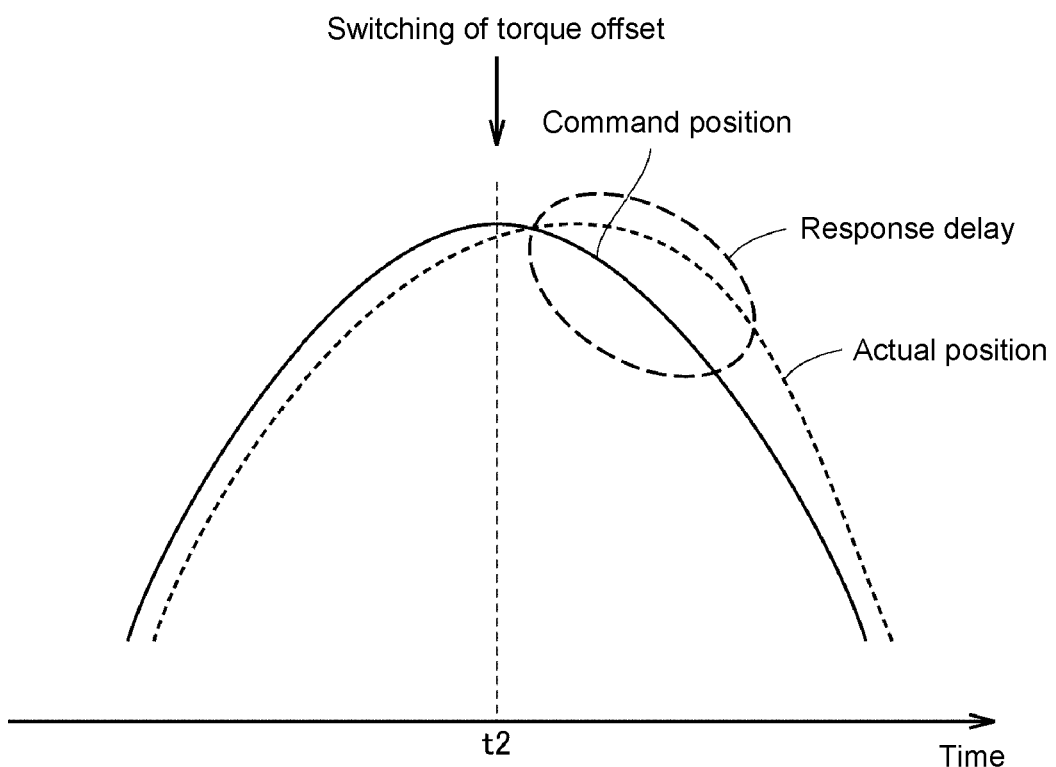
FIG. 5 is a schematic diagram illustrating an example of a position deviation which is caused in a kinetic friction compensating method of the position control system illustrated in FIG. 4.

FIG. 5 is a schematic diagram illustrating an example of a position deviation which is generated in the kinetic friction compensating method in the position control system illustrated in FIG. 4. FIG. 5 illustrates an example of a relationship between a command position and an actual position of the controlled object in the vicinity of time t2 in FIG. 4.

As illustrated in FIG. 5, at time t2, a command value is given to the controlled object such that the moving direction is switched from the forward direction to the reverse direction, and the torque offset is set to correspond to movement in the reverse direction. However, when a kinetic friction compensating function is actually started by the torque offset, a certain time delay may occur.

As a result, as illustrated in FIG. 5, the actual position of the controlled object does not immediately respond to a change in the command position from the control device 100 and a certain position deviation may be generated (see "response delay" in FIG. 5). Since the purpose of the position control system is to match the actual position of the controlled object with a pre-designated target trajectory (the command position) as much as possible, a time delay may occur due to only switching the torque offset (the compensation value for the kinetic friction torque) to correspond to the change of the moving direction of a command speed. That is, trackability of the actual position of the controlled object for the target trajectory may not be able to be enhanced.

Therefore, in the position control according to this embodiment, the torque offset (the compensation value for the kinetic friction torque) is switched prior to the change of the moving direction of the command speed.

Figure 6:
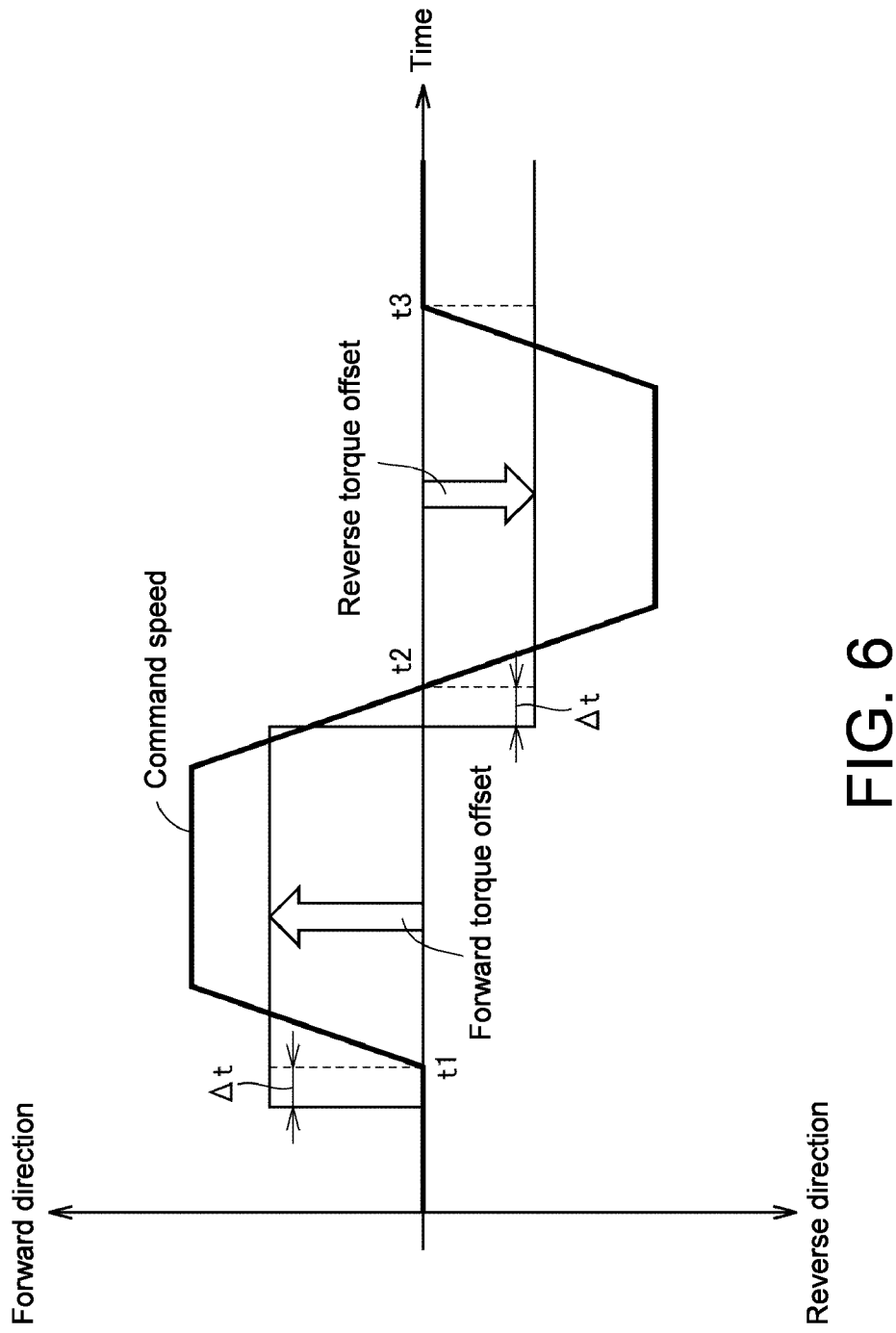
FIG. 6 is a schematic diagram illustrating an example of the kinetic friction compensating method in the position control system according to the embodiment.

FIG. 6 is a schematic diagram illustrating an example of the kinetic friction compensating method in the position control system according to this embodiment. FIG. 6 illustrates behavior when the same command speed as illustrated in FIG. 4 is given.

Referring to FIG. 6, the command speed starts increasing from zero at time t1. A forward torque offset is set as the torque offset earlier by a time Δt to time t1. Similarly, the command speed is switched from the forward direction to the reverse direction at time t2. A reverse torque offset is set as the torque offset earlier by the time Δt to time t2.

The time Δt for setting or switching the torque offset prior to the time at which the command speed changes is also referred to as a "preceding switching time." It is possible to reduce a deviation between the actual position and the command position illustrated in FIG. 5 using the preceding switching time illustrated in FIG. 6.

In the position control according to this embodiment, the preceding switching time in addition to the forward and reverse torque offsets is determined by an identifying process of kinetic friction characteristics performed in advance. By acquiring kinetic friction characteristics through such an identification process, it is possible to realize the position control using characteristic values suitable for a controlled object.

In the control system 1 according to this embodiment, tuning of the control system including the control device 100 and the servo driver 200 is facilitated by giving both a command value and a torque offset (a compensation value for a kinetic friction torque) from the control device 100 to the servo driver 200. A target trajectory may be corrected depending on kinetic characteristics of the control device 100 and then a command value given from the control device 100 to the servo driver 200 may be calculated. Also when such a corrected command value is used, the torque offset (the compensation value for the kinetic friction torque) can also be determined by the control device 100 and thus it is possible to avoid occurrence of a problem such as a conflict of compensation between the control device 100 and the servo driver 200.

E. PROCESSING PROCEDURE

Figure 7:
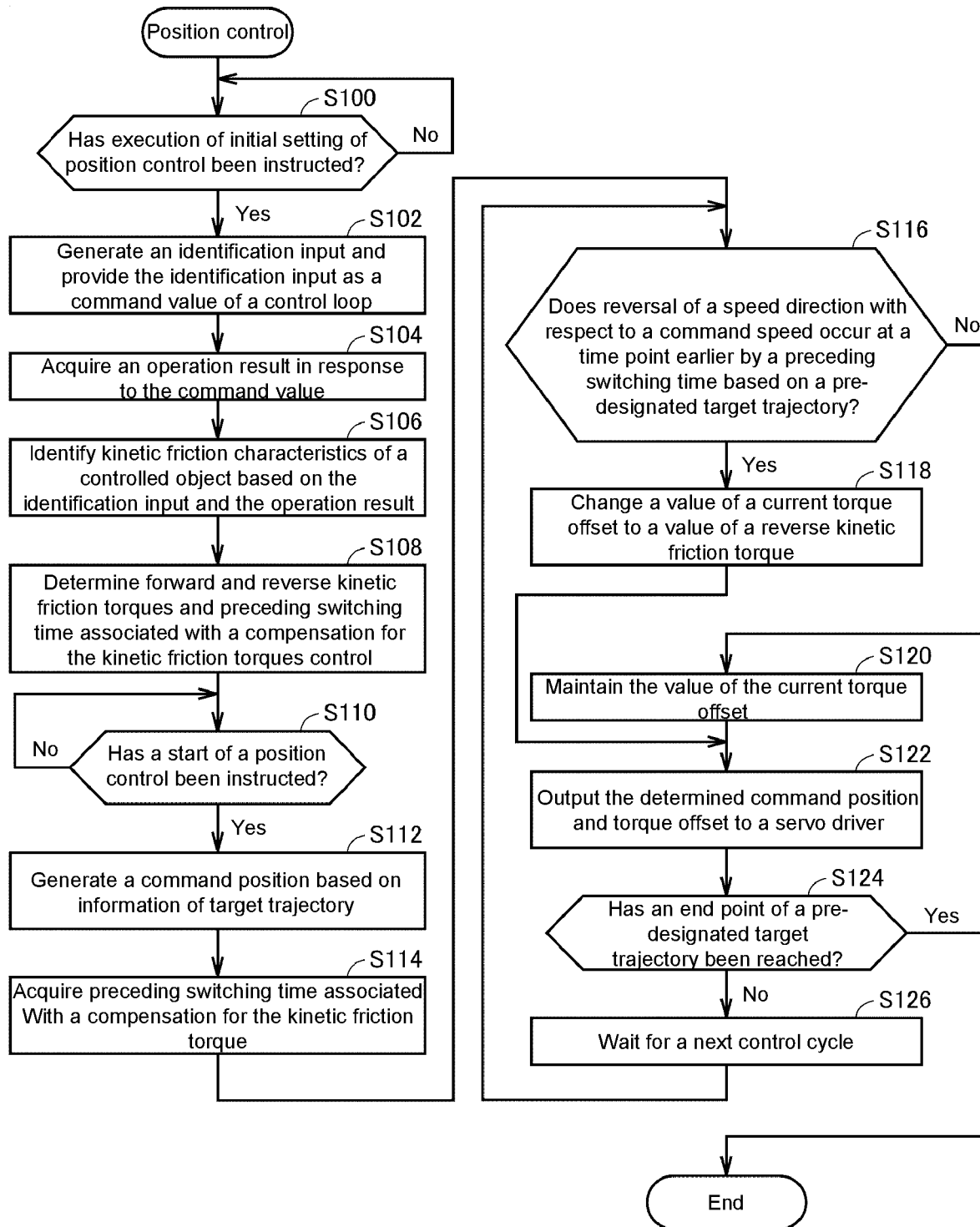
FIG. 7 is a flowchart illustrating a processing procedure which is performed by the control device according to the embodiment.

An outline of a processing procedure which is performed by the control device 100 according to this embodiment will be described below. FIG. 7 is a flowchart illustrating a processing procedure which is performed by the control device 100 according to this embodiment. Steps illustrated in FIG. 7 may be embodied by causing the processor 102 of the control device 100 to execute a control program (which includes the system program 110 and the user program 112 illustrated in FIG. 2). The processing procedure illustrated in FIG. 7 includes an identifying process of kinetic friction characteristics for acquiring kinetic friction characteristics of a controlled object and a control process for performing position control of the controlled object on the basis of the acquired kinetic friction characteristics.

Referring to FIG. 7, the control device 100 performs the identifying process of kinetic friction characteristics illustrated in Steps S102 to S108 when the execution of the initial setting of the position control according to this embodiment is instructed (YES in Step S100). That is, in Steps S102 to S108, a process of giving a first command serving as a command value to the drive device (the servo driver 200) and determining a torque required for the controlled object to execute the first command is performed.

Specifically, the control device 100 generates an identification input, gives the generated identification input as a command value of a control loop (Step S102), and acquires an operation result in response to the command value (Step S104). The control device 100 identifies the kinetic friction characteristics of the controlled object on the basis of the identification input and the operation result (Step S106) and determines the forward and reverse kinetic friction torques and the preceding switching time associated with compensation for the kinetic friction torques (Step S108). The control device 100 stores the determined kinetic friction torques and the preceding switching time associated with compensation for the kinetic friction torques as kinetic friction characteristics of the controlled object.

Subsequently, when starting the position control according to this embodiment is instructed (YES in Step S110), the control device 100 performs the position control including kinetic friction compensation using the identification result, which is illustrated in Steps S112 to S126. That is, in Steps S112 to S126, a process of giving a second command as the command value and giving a third command as a compensation command to the drive device (the servo driver 200) and determining the preceding switching time on the basis of a response from the controlled object is performed.

Specifically, the control device 100 generates a command position on the basis of information of a pre-designated target trajectory (Step S112). The control device 100 acquires the preceding switching time associated with compensation for the kinetic friction torques (Step S114) and determines whether a reversal of a speed direction with respect to the command speed occurs at a time point earlier by the acquired preceding switching time on the basis of the pre-designated target trajectory (Step S116). That is, it is determined whether a reversal of the moving direction of the controlled object in the target trajectory occurs at the time point earlier by the acquired preceding switching time.

When it is determined that the reversal of the speed direction of the command speed occurs at the time point earlier by the acquired preceding switching time (YES in Step S116), the control device 100 changes a value of the current torque offset to a value of the reverse kinetic friction torque (Step S118).

On the other hand, when it is determined that the reversal of the speed direction of the command speed does not occur at the time point earlier by the acquired preceding switching time (NO in Step S116), the control device 100 maintains the value of the current torque offset (Step S120).

Then, the control device 100 outputs the determined command position and the torque offset to the servo driver 200 (Step S122).

The control device 100 determines whether the controlled object has reached an end point of the pre-designated target trajectory on the basis of the actual position of the actuator 2 (Step S124). When it is determined that the controlled object has not reached the end point of the pre-designated target trajectory (NO in Step S124), the control device waits for a next control cycle (Step S126) and repeats the processes of Step S112 and the steps subsequent thereto.

On the other hand, when it is determined that the controlled object has reached the end point of the pre-designated target trajectory (YES in Step S124), the processing procedure ends.

The position control according to this embodiment is performed through the above-mentioned processing procedure.

F. FUNCTIONAL CONFIGURATION

The functional configuration of the control device 100 for realizing the position control according to this embodiment will be described below.

Figure 8:
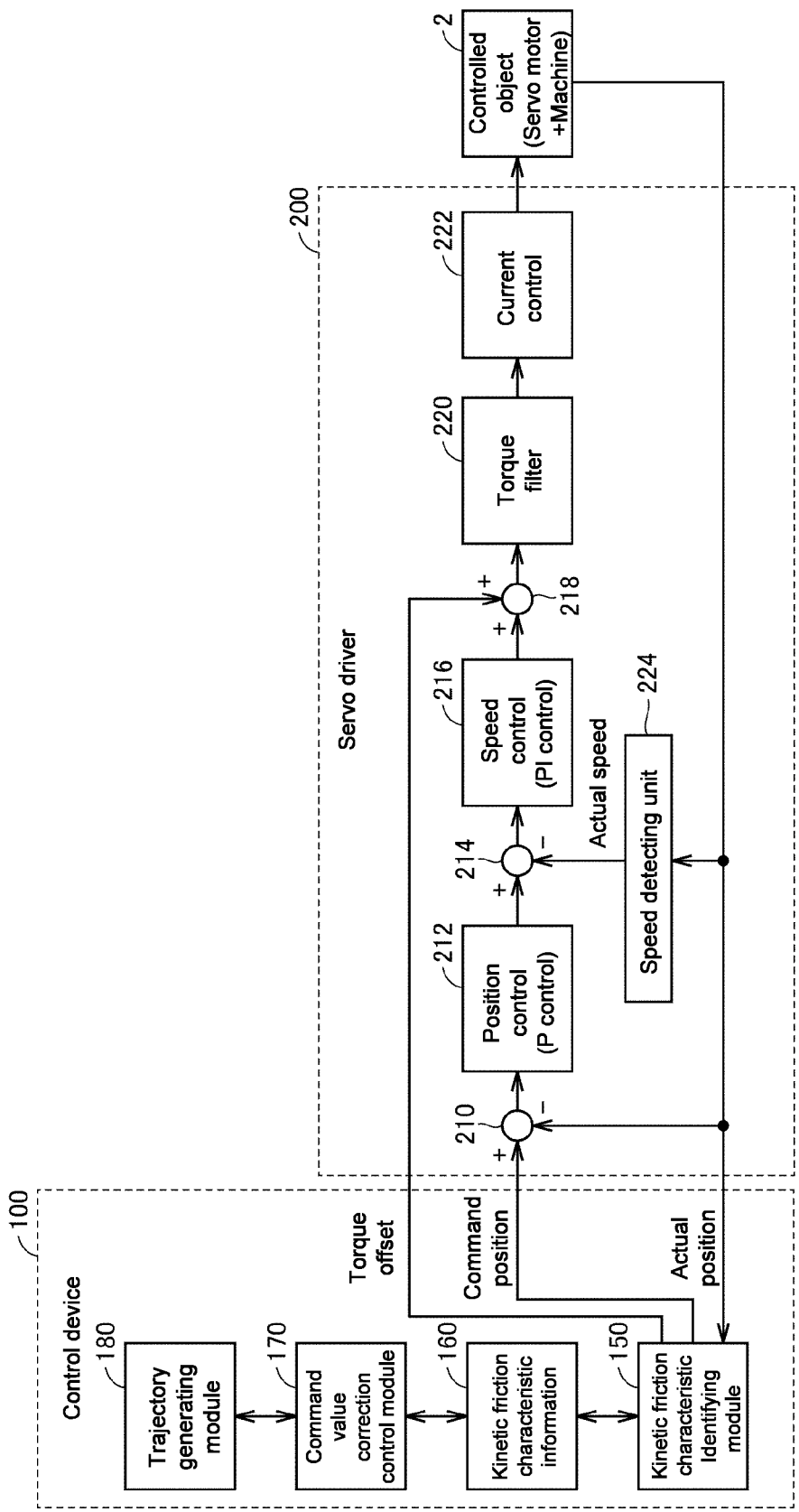
FIG. 8 is a schematic diagram illustrating a functional configuration when an identifying process of kinetic friction characteristics is performed by the control device according to the embodiment.
Figure 9:
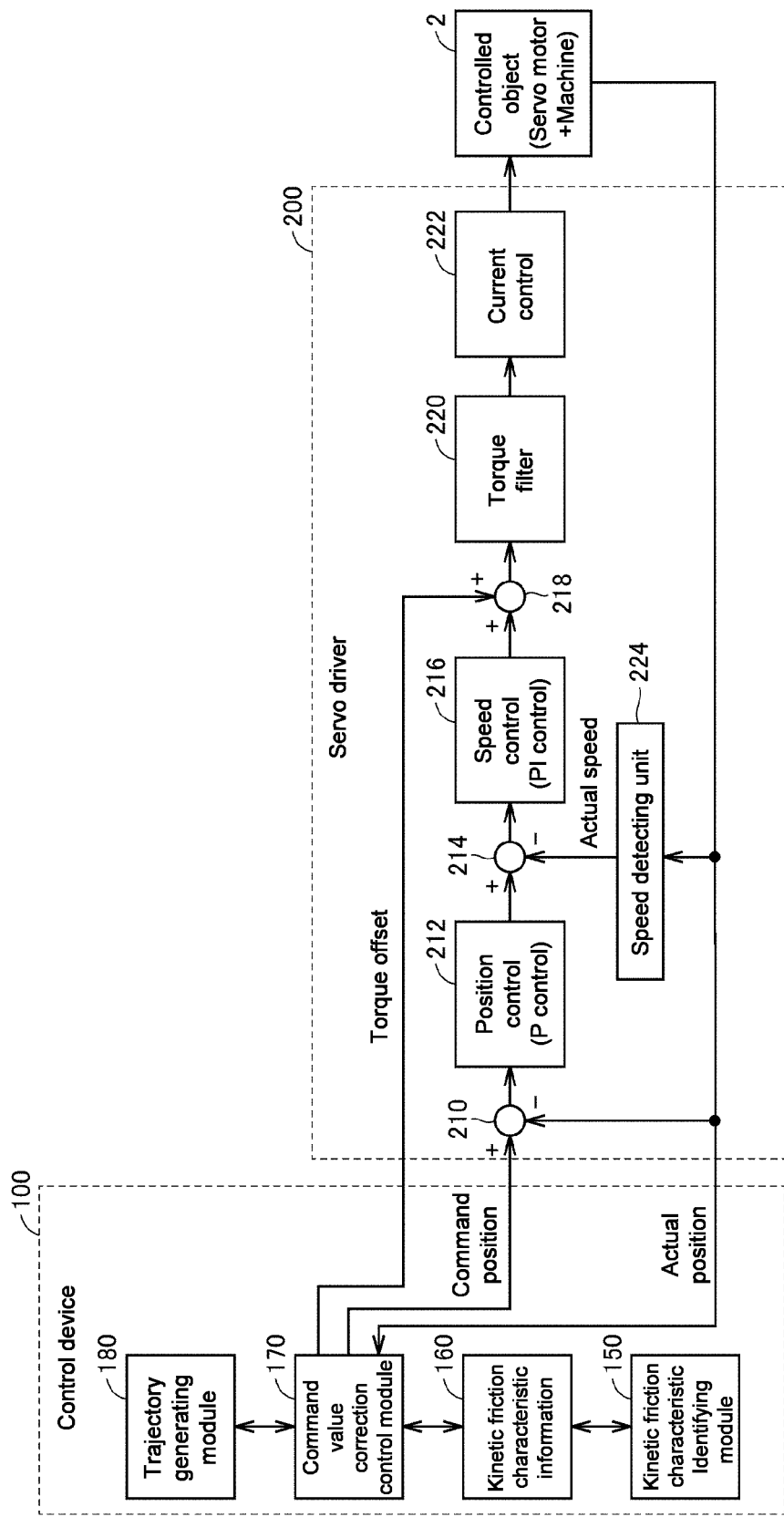
FIG. 9 is a schematic diagram illustrating a functional configuration when position control of a controlled object is performed by the control device according to the embodiment.

FIG. 8 is a schematic diagram illustrating the functional configuration when the identifying process of kinetic friction characteristics is performed by the control device 100 according to this embodiment. FIG. 9 is a schematic diagram illustrating the functional configuration when the position control of the controlled object is performed by the control device 100 according to this embodiment.

Referring to FIGS. 8 and 9, the control device 100 according to this embodiment includes a kinetic friction characteristic identifying module 150, a command value correction control module 170, and a trajectory generating module 180 as a functional configuration. The modules may be embodied by causing the processor 102 of the control device 100 to execute a control program.

The kinetic friction characteristic identifying module 150 mainly performs the identifying process of kinetic friction characteristics for acquiring kinetic friction characteristics of a controlled object. The command value correction control module 170 and the trajectory generating module 180 perform a control process for performing the position control of a controlled object on the basis of kinetic friction characteristics information 160.

Referring to FIG. 8, in the identifying process of kinetic friction characteristics, the kinetic friction characteristic identifying module 150 generates an identification input for a command position and a torque offset and outputs the generated identification input to the servo driver 200. The kinetic friction characteristic identifying module 150 acquires an operation result including information such as an actual position from the servo driver 200.

The kinetic friction characteristic identifying module 150 identifies kinetic friction characteristics of the controlled object on the basis of the identification input and the operation result and outputs the identification result as the kinetic friction characteristics information 160. The kinetic friction characteristics information 160 includes forward and reverse kinetic friction torques and a preceding switching time associated with compensation for the kinetic friction torques.

Referring to FIG. 9, in the position control of a controlled object, the trajectory generating module 180 has information of a pre-designated target trajectory and sequentially outputs a command position such that the actual position of the actuator 2 changes along the target trajectory.

The command value correction control module 170 determines the value of the torque offset in each control cycle with reference to the kinetic friction characteristics information 160. That is, the command value correction control module 170 determines whether a reversal of the moving direction of the controlled object in the target trajectory occurs at the time point earlier by the acquired preceding switching time. More specifically, the command value correction control module 170 determines whether a reversal of the speed direction of the command speed occurs at the time point earlier by the acquired preceding switching time on the basis of the pre-designated target trajectory, and updates the value of the torque offset when switching is performed. The command value correction control module 170 outputs the command position and the torque offset to the servo driver 200.

G. DETAILS OF IDENTIFYING PROCESS OF KINETIC FRICTION CHARACTERISTICS

Details of the identifying process of kinetic friction characteristics will be described below. The following details of the process correspond to the processes of Steps S102 to S108 illustrated in FIG. 7 and the function of the kinetic friction characteristic identifying module 150 illustrated in FIG. 8.

In the identifying process of kinetic friction characteristics, a kinetic friction torque (corresponding to a forward torque offset) generated in the controlled object when the actual speed has a forward direction and a kinetic friction torque (corresponding to a reverse torque offset) generated in the control torque when the actual speed has a reverse direction are determined as characteristic values for compensating for the kinetic friction torque of the controlled object.

In the identifying process of kinetic friction characteristics, the preceding switching time indicating what time the switching of the torque offset for compensating for the forward/reverse kinetic friction torques is performed prior to a time point at which the speed direction of the command speed is switched is determined. This is because, when the torque offset (the compensation value for the kinetic friction torque) is updated at the time point of forward/reverse switching of the command speed (the moving direction of the command speed) which is calculated from the command position, this is too late and thus the value of the torque offset is switched a certain time prior to the time point of forward/reverse switching of the command speed.

Typically, the preceding switching time associated with compensation for the kinetic friction torque (the time by which switching of the kinetic friction compensation torque is performed earlier) may be defined as an integer multiple of a control cycle which is an update period of the command speed. That is, the preceding switching time may be defined as an integer multiple (for example, 0, 1, 2, . . . times) of the update period of the command value given from the control device 100.

g1: Forward/Reverse Kinetic Friction Torque

A method of measuring a forward kinetic friction torque and a reverse kinetic friction torque will be described below.

In order to measure a kinetic friction torque generated in a controlled object when the controlled object moves in the forward direction, the control device 100 (the kinetic friction characteristic identifying module 150 illustrated in FIG. 8) gives a command position (or a command speed) to the servo driver 200 such that the controlled object moves in the forward direction at a constant low speed. An actual torque in a state in which the actual speed satisfactorily settles for the command value is measured and is determined as the forward kinetic friction torque. For example, the motion at a low speed is a motion at several mm/sec to several tens of mm/sec.

In order to measure a kinetic friction torque generated in a controlled object when the controlled object moves in the reverse direction, the control device 100 (the kinetic friction characteristic identifying module 150 illustrated in FIG. 8) gives a command position (or a command speed) to the servo driver 200 such that the controlled object moves in the reverse direction at a constant low speed. An actual torque in a state in which the actual speed satisfactorily settles for the command value is measured and is determined as the reverse kinetic friction torque. For example, the motion at a low speed is a motion at one over a fraction of 1 mm/sec to several mm/sec.

In this way, the control device 100 (the kinetic friction characteristic identifying module 150 illustrated in FIG. 8) has a function of giving a first command as the command value to the drive device (the servo driver 200) and determining a torque required for the controlled object to move in accordance with the first command. In a specific process of the function, the control device 100 (the kinetic friction characteristic identifying module 150 illustrated in FIG. 8) gives a command for causing the controlled object to move in the forward direction (a first direction) at a predetermined speed and a command for causing the controlled object to move in the reverse direction (a second direction different from the first direction) at a predetermined speed as a first command to the servo driver 200. In addition, the control device 100 (the kinetic friction characteristic identifying module 150 illustrated in FIG. 8) determines a forward kinetic friction torque (a first compensation value in the first direction) on the basis of the actual torque required for forward movement and determines a reverse kinetic friction torque (a second compensation value in the second direction) on the basis of the actual torque required for reverse movement.

As described above, the control device 100 (the kinetic friction characteristic identifying module 150 illustrated in FIG. 8) determines the forward kinetic friction torque (the first compensation value) or the reverse kinetic friction torque (the second compensation value) in a state in which the actual torque from the controlled object in response to the first command has settled.

However, instead of a satisfactorily settled state, a time point at which a command value is given and a predetermined time has elapsed may be used.

In measuring the actual torque, an average value of measurement values over a plurality of control cycles may be used to reduce an influence of measurement error or measurement noise. That is, the control device 100 (the kinetic friction characteristic identifying module 150 illustrated in FIG. 8) determines the forward kinetic friction torque (the first compensation value) or the reverse kinetic friction torque (the second compensation value) by averaging a plurality of measurement results for the actual torque.

The servo driver 200 has a control gain associated with the control loop illustrated in FIG. 3, and it is preferable that the control gain is tuned in advance using a known automatic tuning technique or the like. The tuning result does not need to be optimized.

Figure 10:
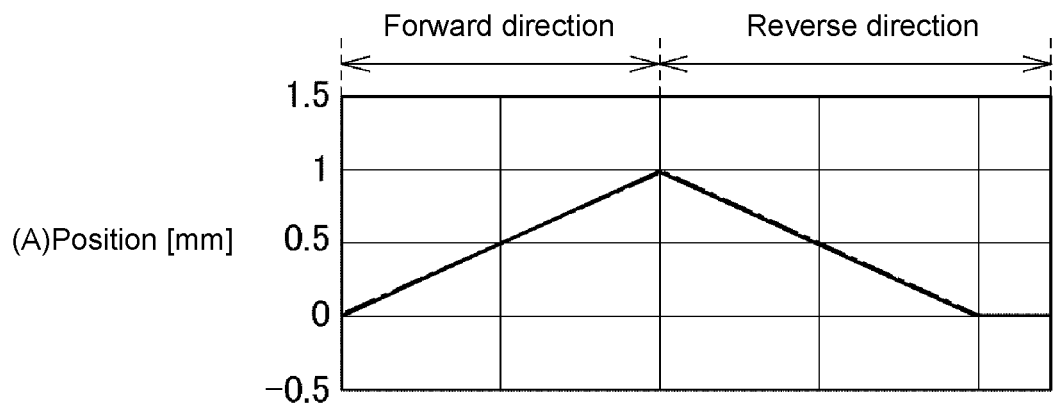
FIG. 10 is a graph illustrating a measurement example of forward/reverse kinetic friction torques in the identifying process of kinetic friction characteristics according to the embodiment.
Figure 10:
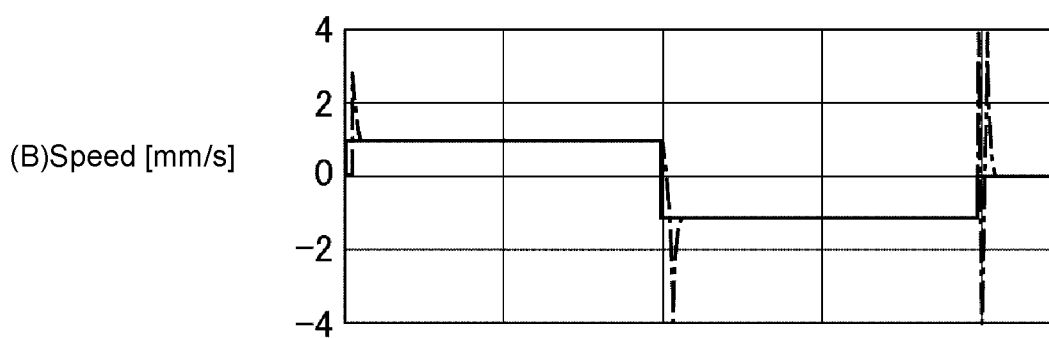
Figure 10:
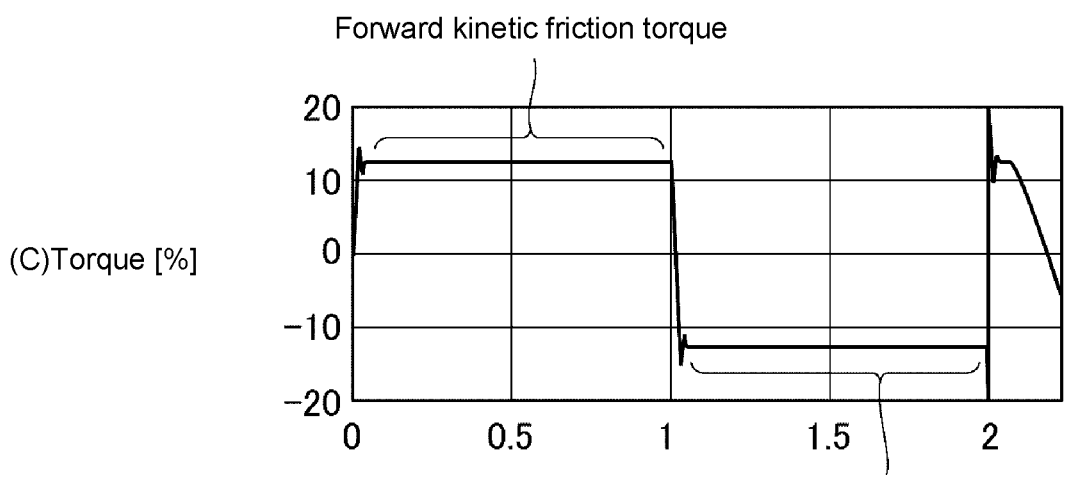

FIG. 10 is a graph illustrating a measurement example of forward/reverse kinetic friction torques in the identifying process of kinetic friction characteristics according to this embodiment. In FIG. 10, (A) represents a change over time of a position of a controlled object, (B) represents a change over time of a speed of a controlled object, and (C) represents a change over time of a torque of a controlled object.

As illustrated in (A) of FIG. 10, a command position as an identification input is changed such that the command speed has the forward direction and the reverse direction. That is, by changing the command position to the forward direction and then changing the command position to the reverse direction, the command speed is maintained at a value in the forward direction and then is maintained at a value in the reverse direction as illustrated in (B) of FIG. 10. The forward kinetic friction torque and the reverse kinetic friction torque are determined from the value of the actual torque when the command speed has the forward direction and the reverse direction.

g2: Preceding Switching Time Associated with Compensation for Kinetic Friction Torque A method of measuring a preceding switching time associated with compensation for a kinetic friction torque will be described below.

After the forward/reverse kinetic friction torques are measured as described above, the control device 100 (the kinetic friction characteristic identifying module 150 illustrated in FIG. 8) gives a command position (or a command speed) to the servo driver 200 to stop the controlled object. Before the controlled object is stopped, the control device 100 (the kinetic friction characteristic identifying module 150 illustrated in FIG. 8) gives a measurable large torque offset (a kinetic friction compensation torque) to the servo driver 200.

Due to such a torque offset, the feedback value (the actual position) of the controlled object decreases toward the command position and then changes by increasing. That is, since the command position (or the command speed) given from the control device 100 to the servo driver 200 instructs stopping the controlled object and a measurable large torque offset instructs moving of the controlled object, the controlled object is not stopped but a moving speed thereof increases again.

After a measurable large torque offset is given to the servo driver 200, the time until the feedback value (the actual position) from the controlled object changes to increasing is determined to be the preceding switching time associated with compensation for the kinetic friction torque. When the preceding switching time associated with compensation for the kinetic friction torque is defined with respect to the control cycle which is an update period for the command speed as described above, after giving a measurable large torque offset to the servo driver 200, the number of control cycles present for the feedback value (the actual position) from the controlled object to change to increase is measured.

After a change of the moving speed appears (the moving speed temporarily decreases and increases again), the torque offset is returned to zero.

The preceding switching time associated with compensation for the kinetic friction torque refers to a time required until an effect of compensation actually occurs in the controlled object when a torque offset (that is, a kinetic friction compensation torque) is given to the servo driver 200. That is, the preceding switching time associated with compensation for the kinetic friction torque refers to a kind of "delay time" which is present in a system including the servo driver 200 and the controlled object when viewed from the control device 100.

In this way, the control device 100 (the kinetic friction characteristic identifying module 150 illustrated in FIG. 8) has a function of giving the second command as a command value and giving the third command as a compensation command to the drive device (the servo driver 20) and determining the preceding switching time on the basis of a response from the controlled object. In a specific example of the function, the control device 100 (the kinetic friction characteristic identifying module 150 illustrated in FIG. 8) gives a command for changing the controlled object from a state in which the controlled object moves in the reverse direction (the second direction) to a state in which the controlled object stops to the servo driver 200 and gives a command for switching the moving direction of the controlled object to the forward direction (the first direction) as a torque offset (a compensation command) to the servo driver 200. In addition, the control device 100 (the kinetic friction characteristic identifying module 150 illustrated in FIG. 8) determines the preceding switching time on the basis of the time required until the direction of change over time of the actual position (the actual speed) (that is, change over time of the feedback value) from the controlled object is switched after a torque offset (a compensation command) is given to the servo driver 200.

As illustrated in FIG. 10, when a command for changing the controlled object from a state in which the controlled object moves in the reverse direction to a state in which the controlled object stops is given, the preceding switching time can be determined by giving a torque offset (a compensation command) for switching the moving direction of the controlled object to the forward direction, but the invention is not limited thereto and the moving direction may be a different direction. That is, the preceding switching time may be determined by giving a command for changing the controlled object from a state in which the controlled object moves in the forward direction to a state in which the controlled object stops and giving a torque offset (a compensation command) for switching the moving direction of the controlled object to the reverse direction. In this case, a preceding switching time acquired by measuring only one thereof may be used as a common preceding switching time, or two preceding switching times measured in both directions may be selectively used in correlation with the directions.

It is preferable that a value close to a rated value be used as the measurable large torque offset. For example, when 100% (a rated value) is employed as the measurable large torque offset, the torque offset can be determined as follows in consideration of an offset due to the kinetic friction generated in these directions.

Torque offset (%)=100%+forward kinetic friction torque-reverse kinetic friction torque (%)

For example, when the forward kinetic friction torque is 12.4% and the reverse kinetic friction torque is −12.6%, 12.4−(−12.6)+100=125% is set as the measurable large torque offset. The rated value (100%) does not need to be employed and, for example, 70% to 125% of the rated value may be employed.

In this way, the torque offset (the compensation command) may be determined on the basis of the forward kinetic friction torque (the first compensation value) and the reverse kinetic friction torque (the second compensation value).

Determination of the position at which the feedback value (the actual position) from the controlled object changes from decreasing to increasing may be affected by measurement noise and the like. Accordingly, when an increase of the feedback value is equal to or less than a predetermined value due to filtering the feedback value or the like, it may be ignored. Alternatively, abnormal values and the like may be excluded from a plurality of results obtained through measurement and the resultant values may be averaged to determine the torque offset.

Figure 11:
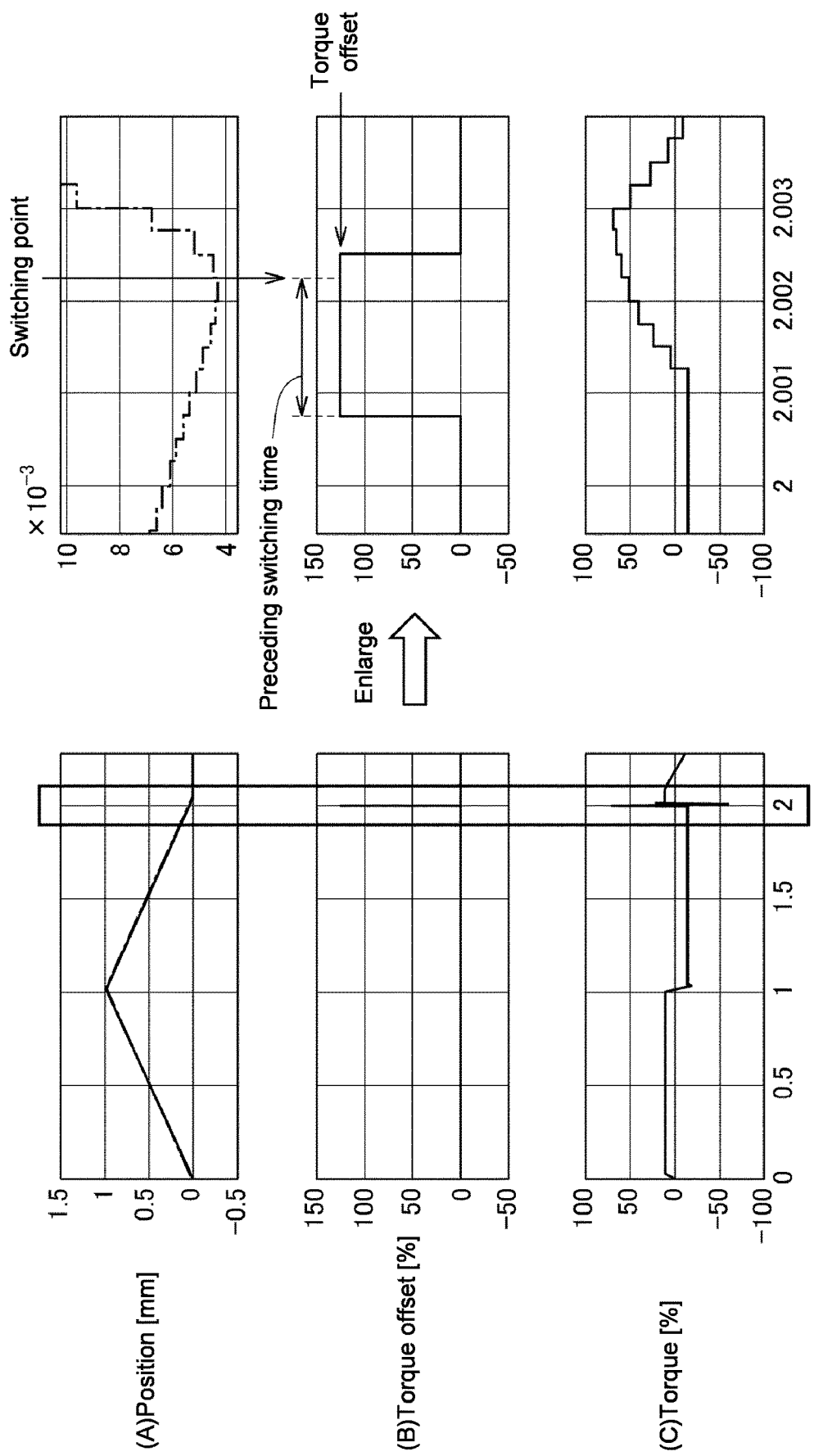
FIG. 11 is a graph illustrating a measurement example of a preceding switching time associated with compensation for a kinetic friction torque in the identifying process of kinetic friction characteristics according to the embodiment.

FIG. 11 is a graph illustrating a measurement example of the preceding switching time associated with compensation for the kinetic friction torque in the identifying process of kinetic friction characteristics according to this embodiment. Enlargements of the graphs illustrated on the left side of FIG. 11 are illustrated on the right side. In FIG. 11, (A) represents a change over time of a position of a controlled object, (B) represents a change over time of a torque offset, and (C) represents a change over time of a torque of a controlled object.

Before the actual position of the controlled object reaches the command position (that is, before the actual speed is zero), the torque offset is set to a predetermined value as illustrated in (B) of FIG. 11. Thereafter, it is assumed that the actual position of the controlled object switches from decreasing to increasing at a certain time as illustrated in (A) of FIG. 11. Then, the time from the time point at which the torque offset is changed to a switching point of the actual position is determined as the preceding switching time. When the switching point is identified, the torque offset is reset to zero.

H. DETAILS OF POSITION CONTROL OF CONTROLLED OBJECT

The position control of the controlled object is performed as follows on the basis of the forward/reverse kinetic friction torques and the preceding switching time associated with compensation for the kinetic friction torque which is acquired in the above-mentioned identifying process of kinetic friction characteristics. Details of the processing procedure associated with the position control of the controlled object correspond to the processes of Steps S110 to S126 illustrated in FIG. 7 and the functions of the command value correction control module 170 and the trajectory generating module 180 illustrated in FIG. 8.

Basically, the command position along the trajectory generated by the trajectory generating module 180 (FIG. 9) of the control device 100 is calculated for each control cycle, and it is determined whether switching of the speed direction will be performed at a time point later by the preceding switching time in each control cycle. When it is determined that switching of the speed direction will be performed at a time point later by the preceding switching time in each control cycle, the value of the torque offset which is given to the servo driver 20 is switched to one of the forward/reverse kinetic friction torques.

That is, the control device 100 (the command value correction control module 170) has a function of sequentially updating a command value which is given to the servo driver 200 on the basis of a pre-designated target trajectory and a function of sequentially updating a compensation command (a torque offset) given to the servo driver 200 in accordance with a command value given to the servo driver 200.

More specifically, in a control cycle ahead of the preceding switching time from a current control cycle, the value of the torque offset is determined as follows depending on whether switching of the speed direction of the command speed is performed and details of the switching.

(1) Case in which switching of the speed direction of the command speed is not performed: the value of the torque offset is maintained.

(2) Case in which the speed direction of the command speed changes from the forward direction to zero: the value of the torque offset is maintained.

(3) Case in which the speed direction of the command speed changes from the reverse direction to zero: the value of the torque offset is maintained.

(4) Case in which the speed direction of the command speed changes from zero or the reverse direction to the forward direction: the forward kinetic friction torque is set as the torque offset.

(5) Case in which the speed direction of the command speed changes from zero or the forward direction to the reverse direction: the reverse kinetic friction torque is set as the torque offset.

In this way, when the moving direction of the controlled object is reversed by the command value at a time point earlier by the acquired preceding switching time, the control device 100 (the command value correction control module 170) updates the value of the compensation command (the torque offset) to a value corresponding to the moving direction after the reversal on the basis of the forward kinetic friction torque (the first compensation value) and the reverse kinetic friction torque (the second compensation value) (corresponding to the above-mentioned cases (4) and (5)). When the movement of the controlled object is stopped by the command value at a time point earlier by the preceding switching time, the control device 100 (the command value correction control module 170) maintains the value of the compensation command (the torque offset) (corresponding to the above-mentioned cases (2) and (3)).

Figure 12:
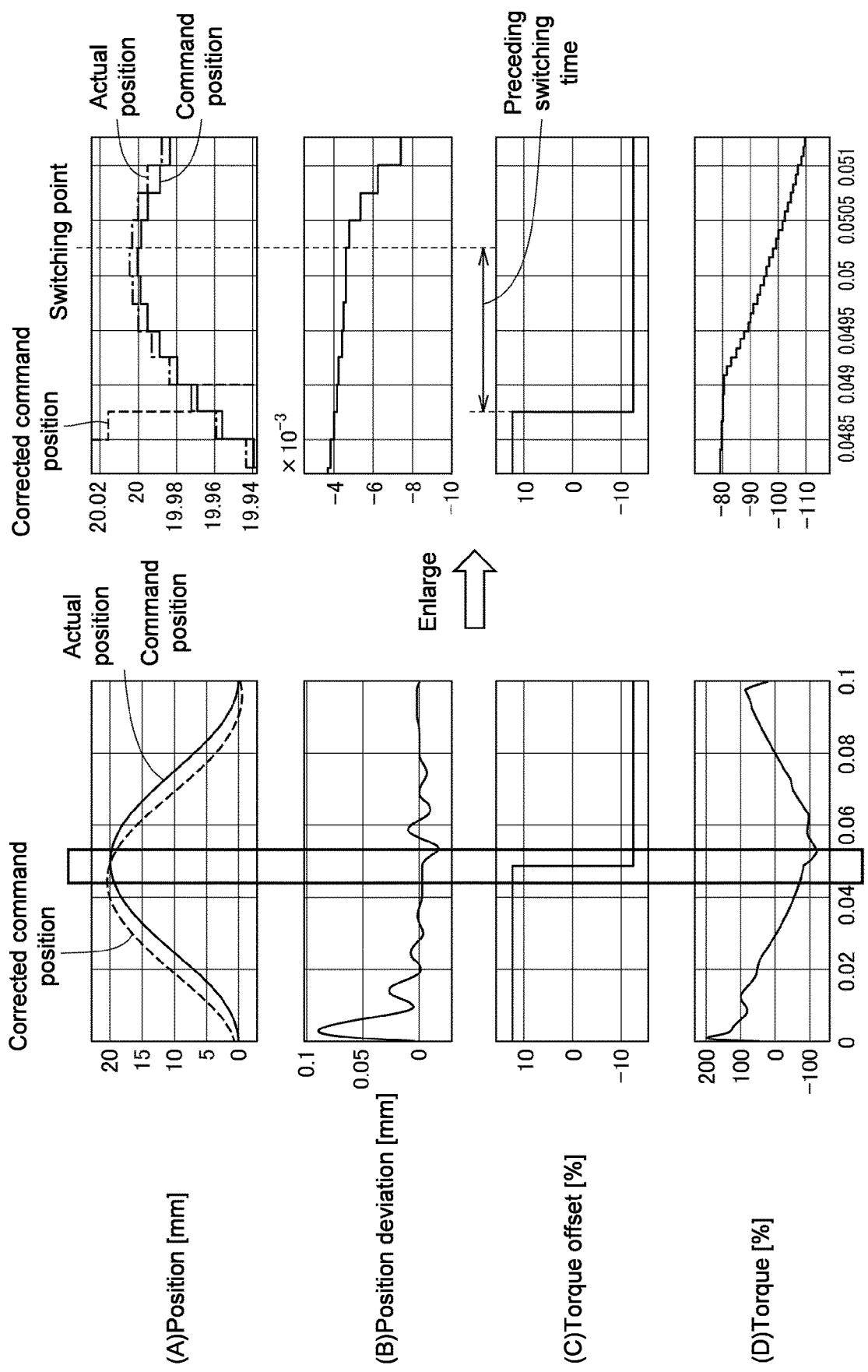
FIG. 12 is a graph illustrating a measurement example of position control of a controlled object according to the embodiment.

FIG. 12 is a graph illustrating a measurement example in the position control of a controlled object according to this embodiment. Enlargements of the graphs illustrated on the left side of FIG. 12 are illustrated on the right side. In FIG. 12, (A) represents a change over time of a position of a controlled object, (B) represents a change over time of a position deviation, (C) represents a change over time of a torque offset, and (D) represents a change over time of a torque of a controlled object.

When a position at which the command position changes from increasing to decreasing, that is, a position at which the command speed switches from the forward direction to the reverse direction (a switching point), as illustrated in (A) of FIG. 12, the value of the torque offset is changed at a point earlier by the preceding switching time to the switching point. In the example illustrated in (C) of FIG. 12, it can be seen that the forward kinetic friction torque (with a positive value) is switched to the reverse kinetic friction torque (with a negative value). With the change of the value of the torque offset, it can be seen that a decreasing rate of the actual torque is advanced from before the switching point as illustrated in (D) of FIG. 12.

By employing such control of switching to the value of the torque offset, it can be seen that the actual position of the controlled object satisfactorily tracks the command position as illustrated in (A) of FIG. 12. In the non-enlarged graph (the left graph) of (A) of FIG. 12, since there is no substantially difference between the command position and the actual position, both are drawn to be the same for the purpose of easy understanding of the drawings. The same is true of the non-enlarged graphs in (A) of FIG. 13 and (A) of FIG. 15 and (A) of FIG. 14.

When a torque filter (see FIG. 3) is implemented in the control loop of the servo driver 200, the torque offset given from the control device 100 does not function as it is and a command value is calculated on the basis of a torque-filtered value. That is, there is a likelihood that an effect of kinetic friction compensation will be reduced by the torque filter in the servo driver 200.

In this case, inverse characteristics of filter characteristics of the torque filter may be applied to the torque offset output from the control device 100 in order not to reduce the effect of kinetic friction compensation.

Figure 13:
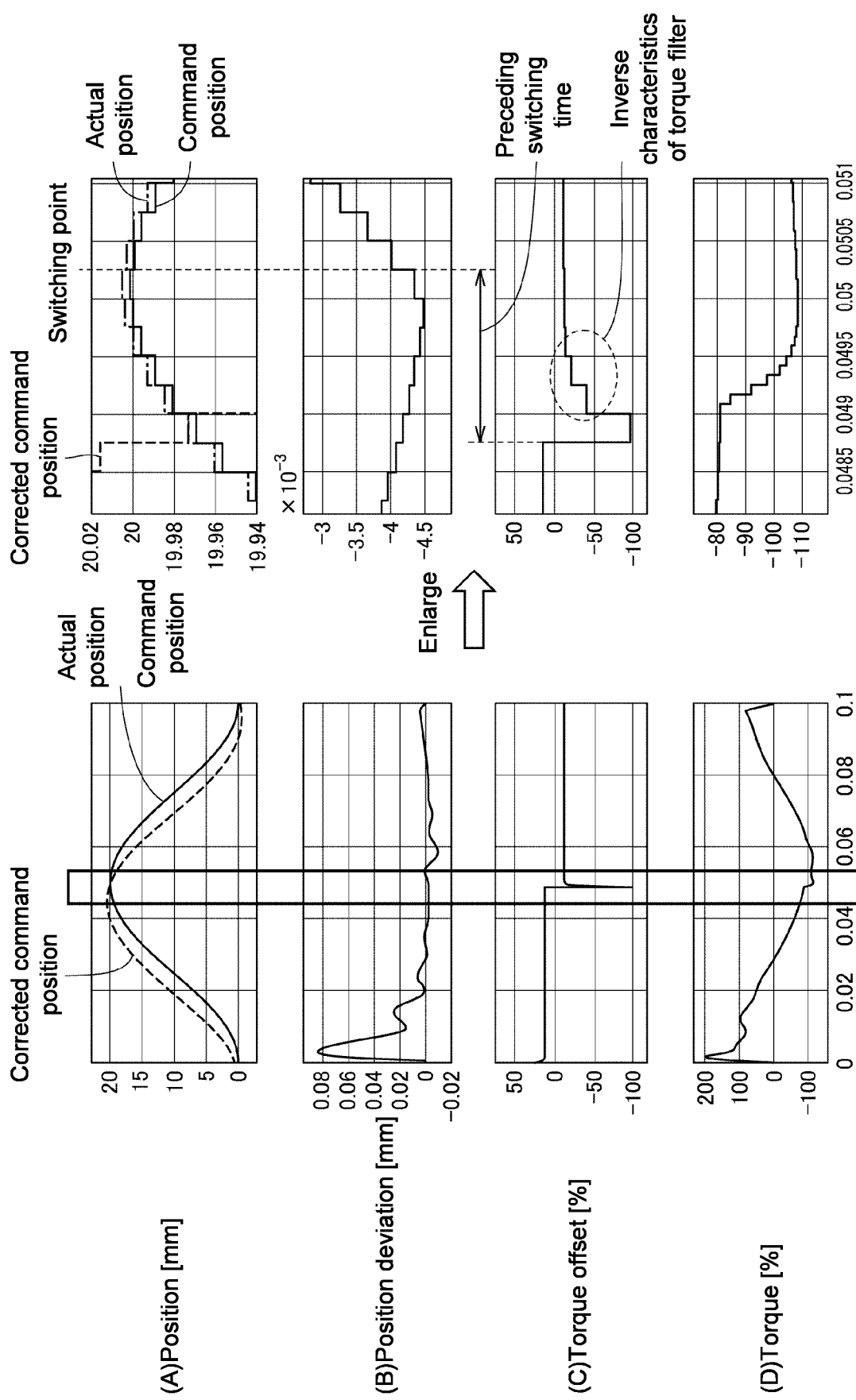
FIG. 13 is a graph illustrating a measurement example of the position control of a controlled object according to the embodiment.

FIG. 13 is a graph illustrating a measurement example in the position control of a controlled object according to this embodiment. Enlargements of the graphs illustrated on the left side of FIG. 13 are illustrated on the right side. In FIG. 13, (A) represents a change over time of a position of a controlled object, (B) represents a change over time of a position deviation, (C) represents a change over time of a torque offset, and (D) represents a change over time of a torque of a controlled object.

When a position at which the command position changes from increasing to decreasing, that is, a position at which the command speed switches from the forward direction to the reverse direction (a switching point), as illustrated in (A) of FIG. 13, the value of the torque offset is changed at a point earlier by the preceding switching time from the switching point. In the example illustrated in (C) of FIG. 13, it can be seen that the forward kinetic friction torque (with a positive value) is switched to the reverse kinetic friction torque (with a negative value). At this time, since inverse characteristics of the filter characteristics of the torque filter are applied, the torque offset is set to a value smaller than the actual reverse kinetic friction torque (with a negative value) at the switching point. A change over time in which the reverse kinetic friction torque (with a negative value) is returned to an original value with the elapse of time is given.

By changing the value of the torque offset as illustrated in (C) of FIG. 13, it is possible to achieve the effect of kinetic friction compensation. As a result, it can be seen that the torque offset is changed in a direction in which the position deviation decreases after the switching point as illustrated in (B) of FIG. 13.

In this way, when the servo driver 200 includes a torque filter (the torque filter 220 illustrated in FIG. 3) that applies filtering to the control value corrected on the basis of the compensation command (the torque offset) from the control device 100 and gives the filtered control value to the controlled object, the control device 100 (the command value correction control module 170) may update the compensation command (the torque offset) given to the servo driver 200 by applying inverse characteristics of the characteristics of the torque filter.

By applying the inverse characteristics of the torque filter, it is possible to achieve the original effect of kinetic friction compensation.

I. EXAMPLES OF EFFECTS i1: Effect of Position Control According to the Embodiment

An example of effects of the position control according to this embodiment will be described below.

Figure 14:
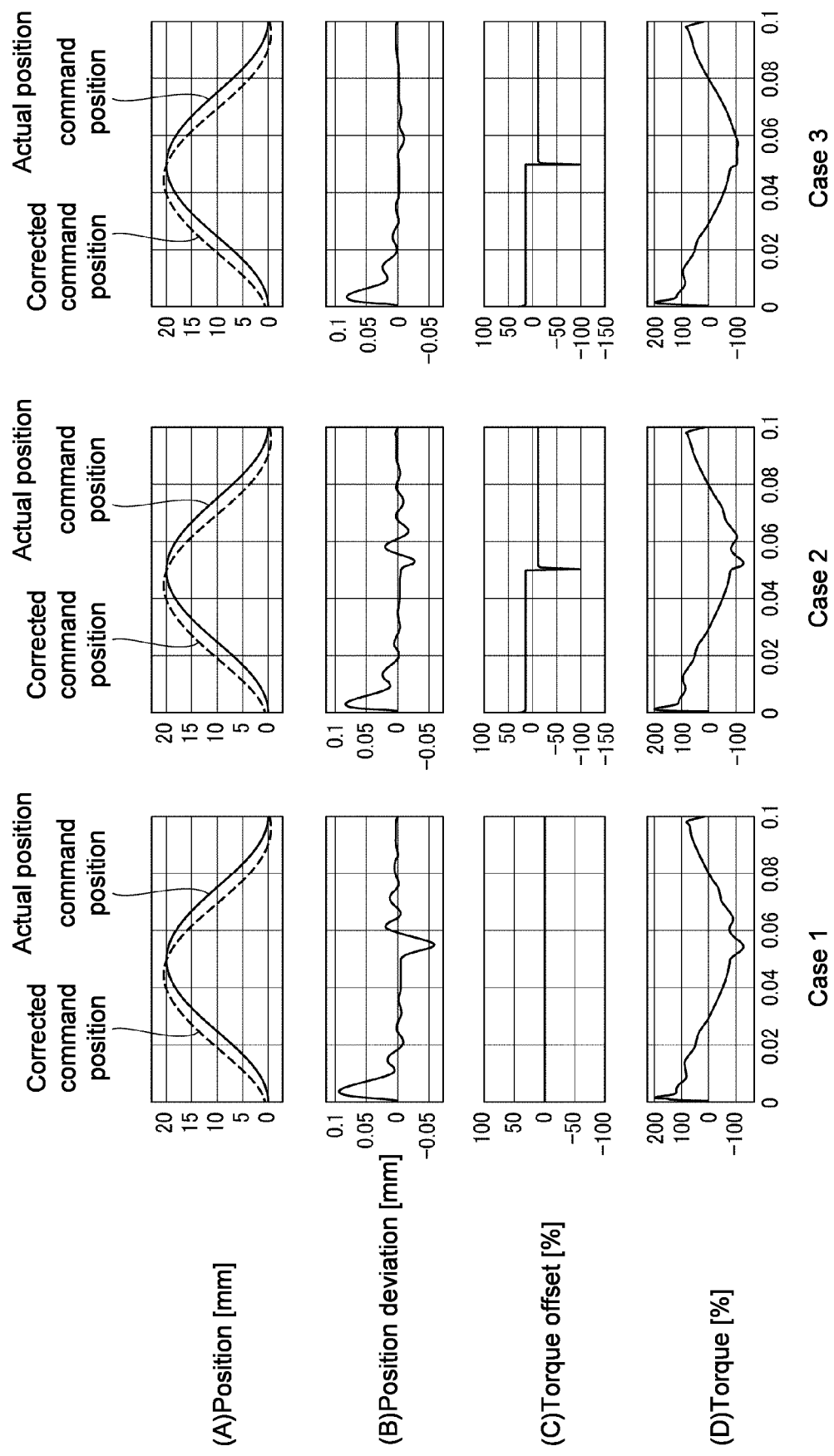
FIG. 14 is a graph illustrating a measurement example associated with compensation for a kinetic friction torque in the position control according to the embodiment.

FIG. 14 is a graph illustrating a measurement example associated with compensation for a kinetic friction torque in the position control according to this embodiment. In FIG. 14, Case 1 and Case 2 are comparative examples, where Case 1 represents a case in which compensation for a kinetic friction compensation torque is not applied and Case 2 represents a case in which compensation for a kinetic friction compensation torque is applied and the preceding switching time is set to 0. On the other hand, Case 3 represents a case in which the preceding switching time obtained by actually performing the identifying process of kinetic friction characteristics is used. In this measurement, the preceding switching time is calculated to be six times the control cycle through the identifying process of kinetic friction characteristics.

In the cases illustrated in FIG. 14, (A) represents a change over time of a position of a controlled object, (B) represents a change over time of a position deviation, (C) represents a change over time of a torque offset, and (D) represents a change over time of a torque of a controlled object.

The purpose of the position control is to match the feedback value (the actual position) of the controlled object with a target trajectory as far as possible and a performance thereof can be evaluated on the basis of the magnitude of a position deviation generated during control. That is, as the position deviation becomes smaller, the performance of the position control can be said to become higher.

First, in Case 1 (without kinetic friction compensation) in FIG. 14, it can be seen that a position deviation with a high peak in the reverse direction is generated immediately after the command position changes from increasing to decreasing (that is, the speed direction switches). On the other hand, in Case 2 (with a preceding switching time=0) in FIG. 14, it can be seen that the peak of the position deviation generated in Case 1 is suppressed and an effect of kinetic friction compensation of a certain degree is achieved without using the preceding switching time.

In Case 3 (with a preceding switching time determined by an identification process), it can be seen that hardly any of the position deviation generated in Case 1 is generated.

In this way, by comparing Cases 1 to 3, it can be seen that accuracy of the position control can be enhanced by switching the torque offset earlier by the preceding switching time.

By determining the preceding switching time depending on a controlled object using the identification process according to this embodiment, it can be seen that an influence of disturbance due to kinetic friction which is generated at a time point at which the speed direction of the command speed is switched can be suppressed and the position deviation can be kept small.

In this way, by employing the identifying process of kinetic friction characteristics for acquiring kinetic friction characteristics of a controlled object and the control process for performing the position control of the controlled object on the basis of the acquired kinetic friction characteristics, it is possible to reduce an error due to kinetic friction in the position control system.

i2: Comparative Example

An example of control performance when a general servo driver having a kinetic friction compensating function is used will be described below as a comparative example.

For example, in the control system of the servo driver 200 illustrated in FIG. 3, a function of compensating for kinetic friction in the servo driver 200 instead of giving the torque offset from the control device 100 is performed. In this configuration, typically, the value of the torque offset is switched depending on one of the forward direction and the reverse direction of the command speed. Accordingly, when command value correction control is implemented in the control device 100 and the function of compensating for kinetic friction on the servo driver 200 side is involved, there may be a problem depending on a designated target trajectory.

Figure 15:
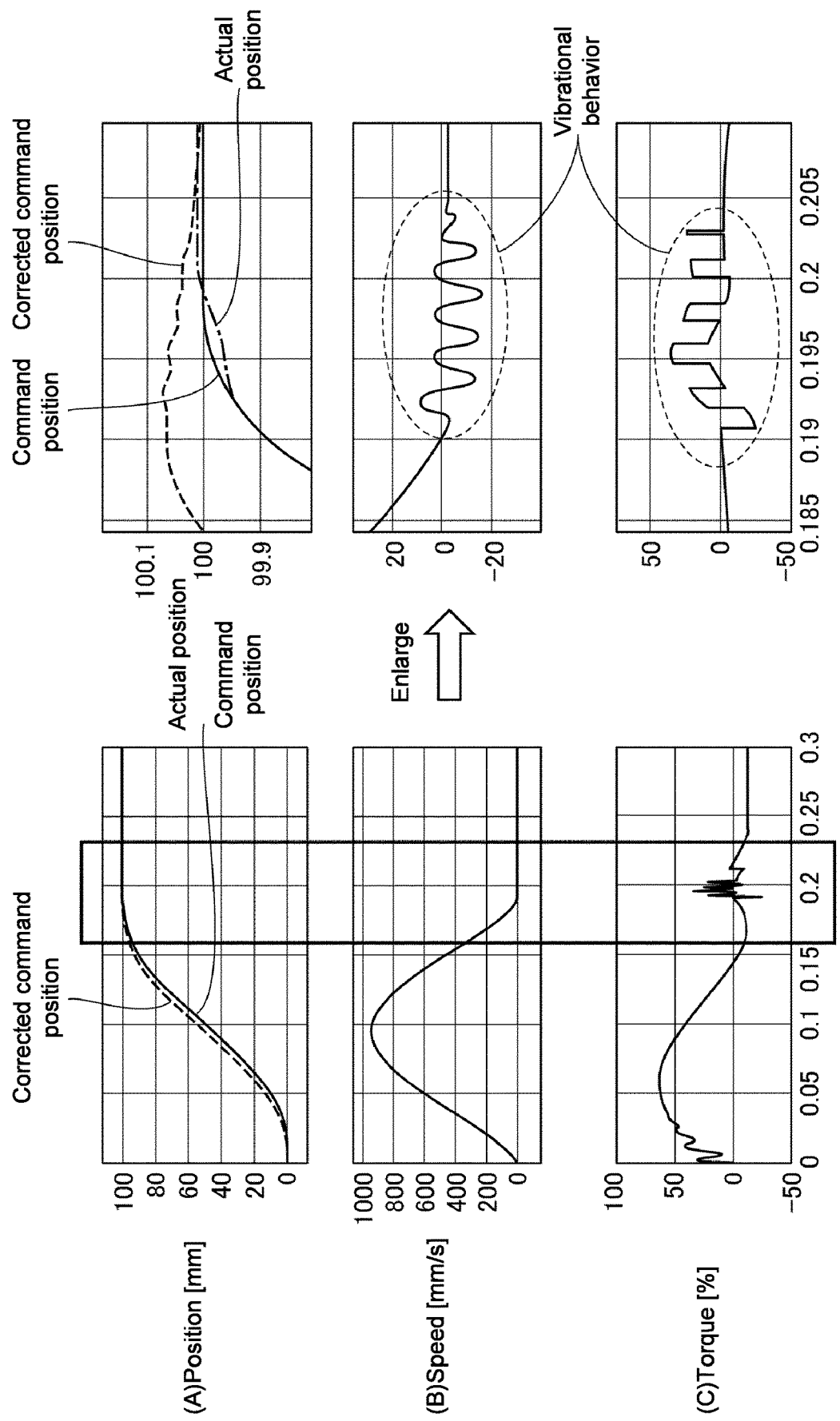
FIG. 15 is a graph illustrating a comparative example of the position control according to the embodiment.

FIG. 15 is a graph illustrating comparative examples with the position control according to this embodiment. Enlargements of the graphs illustrated on the left side of FIG. 15 are illustrated on the right side. In FIG. 15, (A) represents a change over time of a position of a controlled object, (B) represents a change over time of a speed of a controlled object, and (C) represents a change over time of a torque of a controlled object are illustrated.

As illustrated in (A) of FIG. 15, a motion in which the controlled object temporarily passes beyond a stop position of a non-corrected command position and then returns may be output as corrected command positions in order to enhance trackability by the command value correction control of the control device 100. In this case, unnecessary switching of the kinetic friction compensation torque is performed at the return time point and may serve as a trigger to cause vibrational behavior as illustrated in (B) and (C) of FIG. 15.

In the control system 1 according to this embodiment, since the control device 100 determines the torque offset (that is, the kinetic friction compensation torque) in addition to the command value (the command position and/or the command speed), hardly any vibration behavior is caused.

J. CONCLUSION

According to this embodiment, a forward torque offset which is a compensation value for a kinetic friction torque when a controlled object moves in the forward direction and a reverse torque offset which is a compensation value for a kinetic friction torque when the controlled object moves in the reverse direction can be determined by the above-mentioned identification input being given as a command value from the control device 100 to the servo driver 200 which is an example of the drive device. A preceding switching time for setting or switching the torque offset prior to a time point of change of the command speed can also be determined by the above-mentioned identification input being given as a command value from the control device 100 to the servo driver 200 which is an example of the drive device.

The torque offset and the preceding switching time which are determined as described above are dynamically determined depending on characteristics of a controlled object. It is possible to reduce an error due to kinetic friction and to enhance locus accuracy of a target trajectory, by performing position control using the identified features of the controlled object. Accordingly, excellent locus accuracy can be realized even when a mechanical mechanism having relatively large kinetic friction is the controlled object.

Since the above-mentioned identification process is automatically performed, adjustment requiring skills associated with the position control is unnecessary and control performance of the position control can be enhanced with no labor.

The above-disclosed embodiment should be understood to be merely exemplary, and not restrictive in all respects. The scope of the present invention is defined by the appended claims, not by the above description, and is intended to include all modifications within meanings and scopes equivalent to the claims.

What is claimed is:

1. A control device for performing position control of a controlled object by giving a command value and a compensation command to a drive device that drives the controlled object, the control device comprising:
   a first identification device configured to:
      give a command for moving the controlled object in a first direction at a predetermined speed and a command for moving the controlled object in a second direction different from the first direction at the predetermined speed to the drive device, the drive device being configured to calculate an amount of operation of the controlled object on the basis of the command value from the control device and a feedback value from the controlled object, to correct the calculated amount of operation on the basis of the compensation command from the control device, and to give the corrected amount of operation to the controlled object; and
      determine a first compensation value in the first direction on the basis of a torque required for a movement in the first direction and determine a second compensation value in the second direction on the basis of the torque required for the movement in the second direction;
   a second identification device configured to:
      give a command for changing the controlled object from a state of moving in the second direction to a state of stopping to the drive device and give a command for reversing the moving direction of the controlled object to the first direction to the drive device; and
      determine a preceding switching time on the basis of a time required from when the compensation command is given to the drive device until a direction of a change over time of the feedback value from the controlled object;
   a command value updating device configured to sequentially update the command value which is given to the drive device on the basis of a predetermined target trajectory; and a compensation command updating device configured to sequentially update the compensation command given to the drive device on the basis of the command value given to the drive device,
wherein the compensation command updating device updates a value of the compensation command to a value corresponding to a moving direction after a reversal of the moving direction of the controlled object in the target trajectory when the reversal is advanced by the preceding switching time.

2. The control device according to claim 1, wherein the second identification device determines the third command on the basis of the first compensation value and the second compensation value.

3. The control device according to claim 1, wherein the second identification device defines the preceding switching time to be an integer multiple of an update period for the command value given from the control device.

4. The control device according to claim 1, wherein the first identification device determines the first compensation value or the second compensation value in a state in which a torque from the controlled object in response to the command has settled.

5. The control device according to claim 4, wherein the first identification device determines the first compensation value or the second compensation value by averaging a plurality of measurement results for the torque.

6. The control device according to claim 1, wherein the drive device is configured to apply a filter to a control value which is corrected on the basis of the compensation command from the control device and to give the filtered control value to the controlled object, and
the compensation command updating device is configured to update the compensation command given to the drive device by applying an inverse characteristic of a characteristic of the filter.

7. A non-transitory recording medium storing a control program executed by a control device performing position control of a controlled object by giving a command value and a compensation command to a drive device that drives the controlled object, the drive device being configured to calculate an amount of operation of the controlled object on the basis of the command value from the control device and a feedback value from the controlled object, to correct the calculated amount of operation on the basis of the compensation command from the control device, and to give the corrected amount of operation to the controlled object, the control program causing the control device to perform:
a step of
giving a command for moving the controlled object in a first direction at a predetermined speed and a command for moving the controlled object in a second direction different from the first direction at the predetermined speed to the drive device, the drive device being configured to calculate an amount of operation of the controlled object on the basis of the command value from the control device and a feedback value from the controlled object, to correct the calculated amount of operation on the basis of the compensation command from the control device, and to give the corrected amount of operation to the controlled object, and
determining a first compensation value in the first direction on the basis of a torque required for a movement in the first direction and determining a second compensation value in the second direction on the basis of the torque required for the movement in the second direction;
a step of
giving a command for changing the controlled object from a state of moving in the second direction to a state of stopping to the drive device and giving a command for reversing the moving direction of the controlled object to the first direction to the drive device; and
determining a preceding switching time on the basis of a time required from when the compensation command is given to the drive device until a direction of a change over time of the feedback value from the controlled object;
a step of sequentially updating the command value which is given to the drive device on the basis of a predetermined target trajectory; and
a step of sequentially updating the compensation command given to the drive device on the basis of the command value given to the drive device,
wherein the step of sequentially updating the compensation command includes a step of updating a value of the compensation command to a value corresponding to a moving direction after a reversal; of the moving direction of the controlled object in the target trajectory when the reversal is advanced by the preceding switching time.

8. A control system comprising:
a drive device, driving a controlled object; and
a control device, performing position control of the controlled object by giving a command value and a compensation command to the drive device,
wherein the drive device is configured to calculate an amount of operation of the controlled object on the basis of the command value from the control device and a feedback value from the controlled object, to correct the calculated amount of operation on the basis of the compensation command from the control device, and to give the corrected amount of operation to the controlled object, and
the control device comprises:
a first identification device configured to:
give a command for moving the controlled object in a first direction at a predetermined speed and a command for moving the controlled object in a second direction different from the first direction at the predetermined speed to the drive device, the drive device being configured to calculate an amount of operation of the controlled object on the basis of the command value from the control device and a feedback value from the controlled object, to correct the calculated amount of operation on the basis of the compensation command from the control device, and to give the corrected amount of operation to the controlled object; and
determine a first compensation value in the first direction on the basis of a torque required for a movement in the first direction and determine a second compensation value in the second direction on the basis of the torque required for the movement in the second direction,
a second identification device configured to:
give a command for changing the controlled object from a state of moving in the second direction to a state of stopping to the drive device and give a command for reversing the moving direction of the controlled object to the first direction to the drive device; and determine a preceding switching time on the basis of a time required from when the compensation command is given to the drive device until a direction of a change over time of the feedback value from the controlled object, a command value updating device configured to sequentially update the command value which is given to the drive device on the basis of a predetermined target trajectory, and a compensation command updating device configured to sequentially update the compensation command given to the drive device on the basis of the command value given to the drive device, and the compensation command updating device updates a value of the compensation command to a value corresponding a moving direction after a reversal of the moving direction of the controlled object in the target trajectory when the reversal is advanced by the preceding switching time.

\* \* \* \* \*